US008560487B2

(12) United States Patent
Jhoney et al.

(10) Patent No.: US 8,560,487 B2

(45) Date of Patent: Oct. 15, 2013

(54) DETERMINING AND CONVEYING USER AVAILABILITY

(75) Inventors: Albee Jhoney, Bangalore (IN); Umasuthan Ramakrishnan, Bangalore (IN); Dattatreya S. Vellal, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 363 days.

(21) Appl. No.: 12/965,142

(22) Filed: Dec. 10, 2010

(65) Prior Publication Data

US 2012/0150789 A1 Jun. 14, 2012

(51) Int. Cl.

| | |
|---|---|
| ***G06F 9/44*** | (2006.01) |
| ***G06F 3/00*** | (2006.01) |
| ***G06N 5/04*** | (2006.01) |
| *H04L 12/26* | (2006.01) |

(52) U.S. Cl.

CPC ............ *G06N 5/048* (2013.01); *H04L 43/0817* (2013.01)

USPC ............................................... 706/52; 710/15

(58) Field of Classification Search

None

See application file for complete search history.

(56) References Cited

U.S. PATENT DOCUMENTS

| | | | | |
|---|---|---|---|---|
| 6,658,095 | B1 | 12/2003 | Yoakum et al. | |
| 6,697,840 | B1 * | 2/2004 | Godefroid et al. | 709/205 |
| 6,920,478 | B2 | 7/2005 | Mendiola et al. | |
| 6,938,213 | B2 | 8/2005 | Brown et al. | |
| 7,139,797 | B1 | 11/2006 | Yoakum et al. | |
| 7,233,933 | B2 | 6/2007 | Horvitz et al. | |
| 7,243,149 | B2 | 7/2007 | Kelley et al. | |
| 7,444,135 | B2 | 10/2008 | Klassen | |
| 7,444,379 | B2 | 10/2008 | Becker et al. | |
| 7,490,122 | B2 | 2/2009 | Horvitz et al. | |
| 7,664,853 | B2 | 2/2010 | Hagale et al. | |
| 7,680,480 | B2 | 3/2010 | John et al. | |
| 2004/0193684 | A1 | 9/2004 | Ben-Yoseph | |
| 2005/0055405 | A1 | 3/2005 | Kaminsky et al. | |
| 2005/0068167 | A1 | 3/2005 | Boyer et al. | |
| 2006/0026253 | A1 | 2/2006 | Kessen et al. | |
| 2006/0026254 | A1 | 2/2006 | Kessen et al. | |
| 2007/0143472 | A1 | 6/2007 | Clark et al. | |

(Continued)

FOREIGN PATENT DOCUMENTS

| | | |
|---|---|---|
| EP | 1292081 A2 | 3/2003 |
| WO | WO 2010026430 | 3/2010 |

OTHER PUBLICATIONS

Roach, A. B., Session Initial Protocol (SIP)—Specific Event Notification, RFC-3265, Jun. 2002, 38 pages, The Internet Society.

(Continued)

*Primary Examiner* — Alan Chen

(74) *Attorney, Agent, or Firm* — James L. Baudino; Matthew B. Talpis

(57) ABSTRACT

Determining and conveying availability information regarding a user may be accomplished by a variety of techniques. In one general implementation, determining and conveying availability information regarding a user may include determining an availability intent for a user of a user interface device, determining at least one availability desire for the user, and/or determining an inferred availability state for the user. The availability intent, the availability desire, and/or the inferred availability state for the user may be used to determine a composite availability state for the user, and the composite availability state may be conveyed to a remote server system.

14 Claims, 7 Drawing Sheets

(56) References Cited

U.S. PATENT DOCUMENTS

| | | | | |
|---|---|---|---|---|
| 2008/0040431 | A1 | 2/2008 | Bleeker et al. | |
| 2008/0071869 | A1 | 3/2008 | Barber-Mingo et al. | |
| 2008/0133742 | A1 | 6/2008 | Southiere et al. | |
| 2009/0009343 | A1 | 1/2009 | Boyer et al. | |
| 2009/0016510 | A1 | 1/2009 | Becker et al. | |
| 2009/0043627 | A1 | 2/2009 | Vaidya et al. | |
| 2010/0020728 | A1 * | 1/2010 | Jefferson et al. | 370/260 |

OTHER PUBLICATIONS

Rosenberg, J., A Presence Event Package for the Session Initiation Protocol (SIP), RFC-3856, Aug. 2004, 27 pages, The Internet Society.

Sugano, H. et al., Presence Information Data Format (PIDF), RFC-3863 Aug. 2004, 28 pages, The Internet Society.

Niemi, A., Session Initial Protocol (SIP) Extenion for Event State Publication, RFC-3903, Oct. 2004, 32 pages, The Internet Society.

Roach, A. B. et al., A Session Initial Protocol (SIP) Event Notification Extension for Resource Lists, Aug. 2006, 39 pages, The Internet Society.

Rosenberg, J., A Watcher Information Event Template-Package for The Session Initiation Protocol (SIP), RFC-3857, Aug. 2004, 20 pages, The Internet Society.

Day, M. et al., A Model for Presence and Instant Messaging, RFC-2778, Feb. 2000, 17 pages, The Internet Society.

* cited by examiner

DETERMINING AND CONVEYING USER AVAILABILITY

BACKGROUND

The present invention relates to computer networking, and more specifically to determining and conveying the availability state of a user of a computer messaging network.

Computer messaging network users can communicate with each other through a variety of techniques (e.g., e-mail, Instant Messaging, chat rooms, etc.). When communicating, a user can send a single message to another user or try to initiate a communication session with the other user.

An availability service is offered in some Instant Messaging (IM) environments. In this service, the availability state of a user is determined either from an explicitly declared intent (e.g., "Available" or "Unavailable") or an implicitly determined condition (e.g., based on events in the user's computing environment). For example, the idle state of a user's computing environment may trigger a change in the user's availability state to "Away-from-the-computer." Users observing the IM user may use availability information (e.g., availability, location information, last-available time, etc.) before attempting to initiate an IM conversation.

BRIEF SUMMARY

In one implementation, a process for determining and conveying availability information regarding a user may include determining an availability intent for a user of a user interface device, determining at least one availability desire for the user, and/or determining an inferred availability state for the user. The process may also include determining a composite availability state for the user based on the availability intent, the at least one availability desire, and/or the inferred availability state. The composite availability state may be conveyed to a remote server system.

The details and features of various implementations will be conveyed by the following description, along with the drawings.

DETAILED DESCRIPTION

Figure 1:
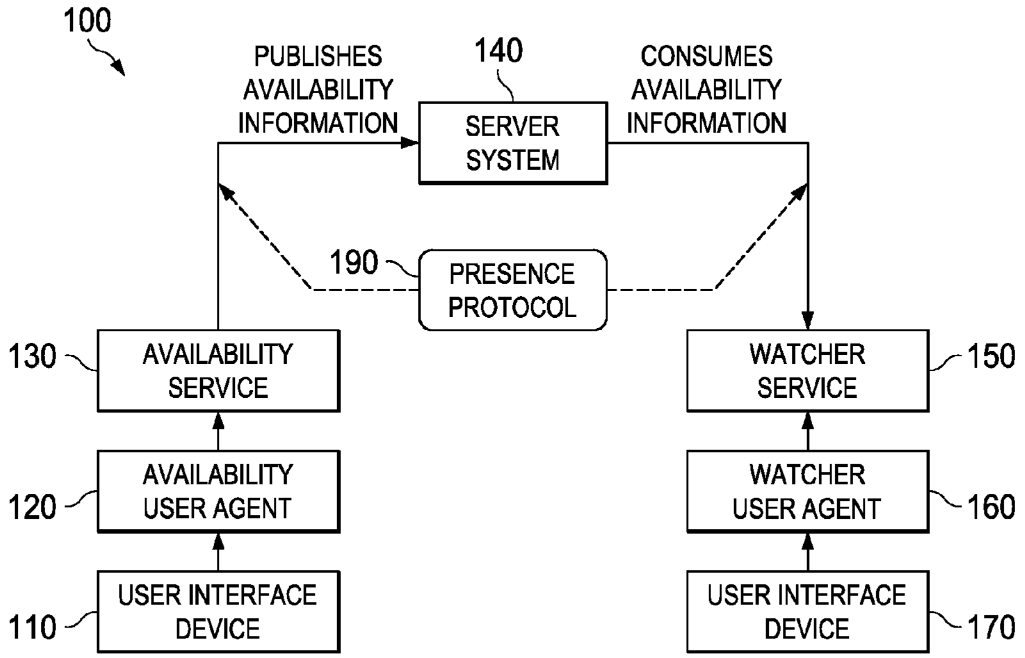
FIG. 1 is a block diagram illustrating an example system for determining and conveying user availability information.

An availability state for a computer user may be determined based on availability intent, one or more availability desires, and/or an inferred availability state. Thus, availability information regarding a computer messaging network user may be determined and conveyed when the declared availability intent of the user is uncertain. Moreover, availability information may be conveyed in a granular manner and with associated messages to provide context to the availability information. Thus, a more accurate availability state may be presented to those interested in communicating with the user. Additionally, the availability information regarding the user may be presented differently depending on which type of person is interested in communicating with the user (e.g., supervisors, co-workers, team members, family, and friends). Thus, a user may only receive communications through available techniques from people that are of current interest to the user.

As will be appreciated by one skilled in the art, aspects of the present disclosure may be implemented as a system, method, or computer program product. Accordingly, aspects of the present disclosure may take the form of an entirely hardware environment, an entirely software embodiment (including firmware, resident software, micro-code, etc.), or an implementation combining software and hardware aspects that may all generally be referred to herein as a "circuit," "module," or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of a computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this disclosure, a computer readable storage medium may be a tangible medium that can contain or store a program for use by or in connection with an instruction execution system, apparatus, or device.

A computer readable signal medium may include a propagated data signal with computer readable program code embodied therein, for example in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any medium, including but not limited to wireless, wireline, optical fiber cable, RF, etc. or any suitable combination of the foregoing.

Computer program code for carrying out operations for aspects of the disclosure may be written in any combination of one or more programming languages such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the disclosure are described below with reference to flowchart illustrations and/or block diagrams of methods, apparatus (systems), and computer program products according to implementations. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other device to function in a particular manner, such that the instructions stored in the computer readable medium produce an article of manufacture including instructions that implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus, or other devices to produce a computer implemented process such that the instructions that execute on the computer or other programmable apparatus provide processes for implementing the functions/acts specified in the flowchart and/or block diagram block or blocks.

FIG. 1 illustrates an example system 100 for generating and conveying availability information regarding a user. The availability of a user may, for instance, be viewed as the willingness and ability of the user to communicate with other users of a messaging network. In general, system 100 includes a first user interface device 110, a second user interface device 170, and a server system 140 that allows messages (e.g., Instant Messages) to be exchanged between the user interface devices. User interface devices 110, 170 may, for example, be personal computers, personal digital assistants (PDAs), workstations, or any other type of computerized device for receiving and sending messages for a user. In particular implementations, user interface devices 110, 170 may communicate using Instant Messaging (IM) techniques, and server system 140 may be one or more Instant Messaging servers.

System 100 also includes an availability user agent 120, an availability service 130, a watcher service 150, and a watcher user agent 160, which cooperate with server system 140 to determine, convey, and receive availability information regarding a user. The availability information provided by availability user agent 120 and watcher user agent 160 may be used by users and/or software of the user interface devices 110, 170 for coordination and communication. Thus, for example, a user of second interface device 170 can determine the availability of the user of first interface device 110 before sending her a message (e.g., initiating a conversation). An availability protocol 190 defines the interaction between server system 140, availability service 130, and watcher service 150 by specifying how the availability information is conveyed.

In certain implementations, the availability information may be an arbitrary number of availability tuples. Each availability tuple may include a status marker (to convey information such as online/offline/busy/away/do not disturb), a communication address (e.g., communication techniques and contact address), and/or other availability markup.

Although only one first user interface device 110, availability user agent 120, availability service 130, watcher service 150, watcher user agent 160, and second user interface device 170 are shown, a system for generating and conveying user availability information may have any number of these elements. For instance, there may be a number of watcher services 150 observing a user of first user interface device 110. Moreover, a user can have more than one availability user agent 120 (e.g., one for each user interface device).

Availability user agent 120, which may reside on user interface device 110 in certain implementations, manipulates availability information for availability service 130. In certain implementations, for example, the availability user agent can extract information from user interface device 110 and convert into a format that is acceptable to availability service 130.

Availability service 130 serves to accumulate the availability information from availability user agent 120 and determine a composite availability state of the user, which will be discussed in more detail below. Availability service 130 also publishes the composite availability state, along with any accompanying messages, to server system 140, which conveys the availability state and any accompanying messages to appropriate watcher services 150.

Availability service 130 may reside on user interface device 110, server system 140, or at an intermediate device. In implementations in which the availability service aggregates availability data from multiple user interface devices of a user, for instance, the availability service may be located at the server system in order to receive the availability information from multiple availability user agents 120. Availability service 130 may use a number of agents that reside on user interface devices 110 (e.g., with availability user agents 120).

Server system 140 accepts, stores, and distributes availability information. Availability service 130 is the provider of the availability information, and watcher service 150 is the consumer of this information. There may be two types of watcher services: (1) fetchers, which request availability information of availability service 130 from server system 140; and (ii) subscribers, which request notification from the server system of changes in the availability information of the availability service. A subscriber may, for instance, request notifications on a regular basis (e.g., poll). A subscriber typically generates subscribe requests to create subscriptions, with server system 140, for example. Server system 140 also maintains information about watcher service 150 and its activities (e.g., fetching or subscribing to availability information). Availability service 130 and watcher service 150 may reside on user interface devices, server system 140, or at points in between.

Server system 140 may use a number of availability agents, which may, for example, be session initiation protocol agents. The availability agents may receive subscribe requests from availability service 130, respond to them, and generate notifications of changes in availability state. An availability agent typically has knowledge of the availability state of the user, which means that it has access to availability data manipulated by availability user agent 120. An availability agent may be addressable with a resource indicator that uniquely identifies the availability service (e.g., sip:joe@example.com). There can be multiple availability agents for a particular availability service 130, each of which handles some subset of the total subscriptions currently active for the availability service. An availability agent may also be a notifier that supports an availability event package.

Particular servers in server system 140 may act as availability agent or as a proxy server for the subscribe requests. When acting as an availability agent, a server may be aware of the availability information of availability service 130. When acting as a proxy, subscribe requests may be proxied to another server that may act as an availability agent.

Server system 140 may have access rules that define the constraints on how it makes availability information available to watcher service 150. Access rules of the availability service's availability information may be manipulated by the user through availability user agent 120. Server system 140 may also have visibility rules regarding how it makes information available to watchers. Visibility rules for watcher service 150 may be manipulated by a user through watcher user agent 160. Additionally, server system 140 may determine whether a watcher service 150 is authorized to subscribe to a service of server system 140.

When a new watcher service 150 sends a subscribe message to server system 140, the server system will notify availability service 130 about the subscription, along with the new watcher service information. Availability service 130 will record the new subscription and respond with an acknowledgement to the server system. Based on this response, the server system will record the subscription and send an acknowledgement to the watcher service with the current availability state. Availability service 130 may convey (e.g., publish) the availability information to the server system as and when the availability state changes and/or periodically.

Availability service 130 may determine the availability state of a user by taking into account one or more factors. For example, the availability service may consider the stated availability intent of the user, the user's expressed availability desire(s), and/or an inferred availability state for the user based on the activity of the user. One or more of these elements may be particular to one or more watchers. Thus, this determination may result in the computation of a watcher service specific availability state for all the subscribed watcher services.

The availability intent of a user is the user's intent for being available at a particular time (e.g., when the user defines the intent). An availability intent is typically a mental attitude that results from deliberation, representing commitments and previous decisions. It is explicitly stated by the user to update the availability state (e.g., available, in a meeting, etc.). In particular implementations, a user's availability intent may be entered through any device, and availability service 130 can overwrite the existing availability intent with the entered one.

The availability desires of a user relate to the objectives of the user in regards to being available. That is, they express the availability that the user desires. Desires are typically motivational attitudes of the user that represent wishes and wants and are generally longer term than an availability intent. Desires may be explicitly stated upfront by the user as a set of policies and rules. Thus, a user may state more than one availability desire. Availability desires also include availability obligations of a user (e.g., I am always available to my boss, I am 50% available to my team, I am 10% available to my friends, etc.). That is, they may represent prohibitions and permissions. A user's availability desires may, however, conflict with each other. The availability service may store the availability desires for the user.

The inferred availability state of a user relates to an availability state determined based on its correlation with the usage patterns of a user interface device. The inferred availability state is an informational attitude that models the expected state of the world, which may be defined by information collected by probes. Moreover, the inferred availability state may be based on learning about the correlation between the perceived world state, determined availability desire state, and the explicitly stated availability intents.

The composite availability state of a user may be determined by availability service 130 based on user input and its own determinations. For example, the user can update the composite availability state by explicitly stating their availability intent and/or their availability desire(s). Availability service 130 can also periodically infer the user's availability state (i.e., form an availability belief) based on the state of the world.

A conflict that arises between the inferred availability state, the current availability intent, and the stated availability desire(s) may be resolved by a schema (examples of which are discussed later), based on the choice of personality for the availability service 130 (also discussed later), or by prompting the user to reconcile their differences. The results of these user prompts may be used to learn and fine tune the world view model of availability service 130 and/or the composite availability model.

The newly determined availability state, which may be watcher specific, is conveyed to server system 140 or stored by the availability service. In the first case, the server system may cache this information and notify and/or respond to watcher service 150 with the availability information. In the second case, the server system may forward an availability query from the watcher service to the availability service when the watcher service needs the availability information. Availability service 130 may determine the availability state on-demand and respond directly to the watcher service.

In IM environments, system 100 may be implemented using the Session Initiation Protocol for Instant Messaging and Presence Leveraging Extensions (SIMPLE), which is an Instant Messaging (IM) and presence protocol suite based on Session Initiation Protocol (SIP). SIMPLE provides: 1) core protocol machinery, which includes actual SIP extensions for subscriptions, notifications and publications; 2) availability documents, which include XML documents carried by the core protocol machinery and that provide for rich availability; 3) privacy and policy documents, which express privacy preferences about how availability documents are to be shown (or not shown) to other users; and 4) provisioning, which includes how users manage their privacy policies, buddy lists.

For example, RFC 3265 defines the core of the SIP event notification framework—SIPSubscribe and SIPNotify methods. RFC 3265 extends SIP and provides a framework by which SIP nodes can request notification from remote nodes indicating that certain events have occurred. Event packages based on this framework may define arbitrarily elaborate rules that govern the subscription and notification for the events or classes of events they describe. The event packages used by this framework (for availability) are defined by RFC 3856, RFC 4662, and RFC 3903. RFC 3856 extends the framework and defines availability as an event package, which may allow watcher user agent 160 to be notified of the availability state of an availability service 130. RFC 4662 extends the framework to allow a client to subscribe to a list of resources using a single subscription. The resource list server, for example, will "expand" the subscription and subscribe to each individual member of the list. Its primary usage with availability is to allow subscriptions to buddy lists, which will be discussed below. A user can manage the entries in their buddy list using the provisioning mechanisms. RFC 3903 extends the framework to define a method for availability service 130 to publish its current state for the availability event package. Once the service publishes its availability state, server system 140 may send notifications of this state change using RFC 3856. Communications between watcher services, the server system, and availability services may be accomplished using an extended Presentity Information Data Format (PIDF) as described in RFC 3863.

In general, a subscription is a set of application states associated with a dialog. In an IM environment, an application state may include a pointer to the associated dialog, the event package name, and possibly an identification token. Event packages may define additional subscription state information. Subscriptions can expire and subscribers may need to refresh subscriptions on a periodic basis. A subscriber can specify request URI to identify the resource for which event notification is desired (e.g., sip:datta@in.abc.com to subscribe to availability state of Datta) and the event header, to indicate the event or a class of events. The event header may contain a token that corresponds to an event package (an additional specification that defines the syntax & semantics of the set of state-information to be reported by a notifier to a subscriber).

Figure 2:
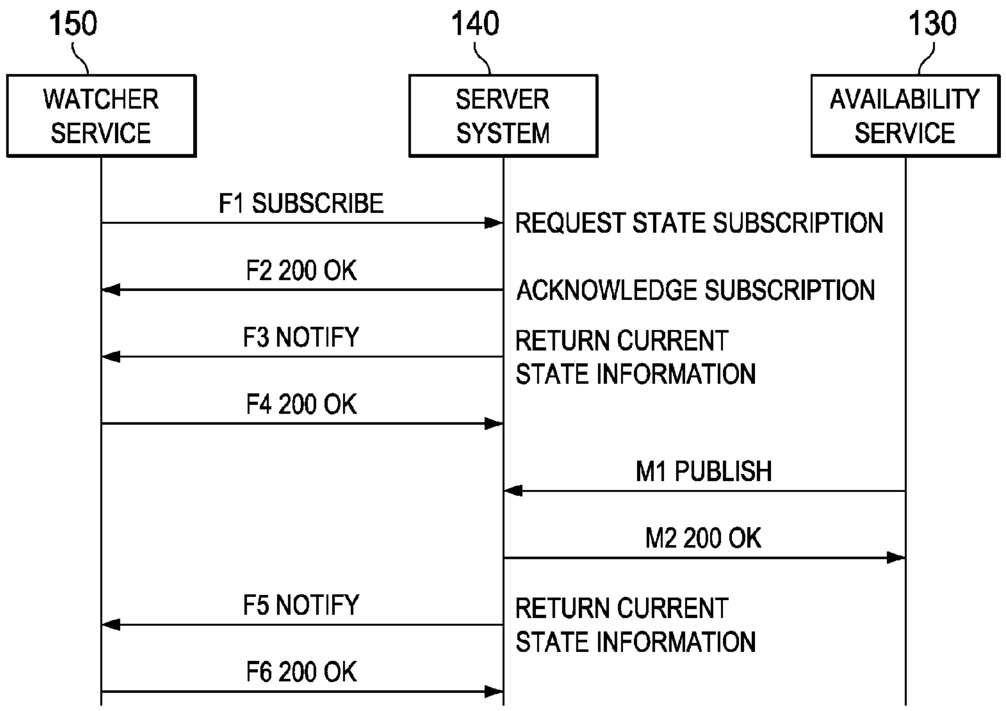
FIG. 2 is a messaging diagram illustrating an example process for conveying user availability information.

FIG. 2 illustrates messaging that may occur for watcher service 150 to establish a subscription with server system 140 for conveying the availability state of a user determined by availability service 130. The messaging begins with watcher service 150 sending a subscription request F1. An example message for watcher service 150 to subscribe to server system 140 is:

```
SUBSCRIBE sip:resource@example.com SIP/2.0
Via: SIP/2.0/TCP watcherhost.example.com;branch=z9hG4bKnashds7
To: <sip:resource@example.com>
From: <sip:user@example.com>;tag=xfg9
Call-ID: 2010@watcherhost.example.com
CSeq: 17766 SUBSCRIBE
Max-Forwards: 70
Event: availability
Accept: application/pidf+xml
Contact: <sip:user@watcherhost.example.com>
Expires: 600
Content-Length: 0
```

If the subscription is valid, server system 140 responds with a message containing the current state information F3.

Availability service 130 updates server system 140 by sending a message containing a publish request including updated availability state information M1. An example message for availability service 130 to send a publish message to server system 140 is:

```
PUBLISH sip:presentity@example.com SIP/2.0
Via: SIP/2.0/UDP pua.example.com;branch=z9hG4bK652hsge
To: <sip:presentity@example.com>
From: <sip:presentity@example.com>;tag=1234wxyz
Call-ID: 81818181@pua.example.com
CSeq: 1 PUBLISH
Max-Forwards: 70
Expires: 3600
Event: availability
Content-Type: application/pidf+xml
Content-Length: ...
```

Server system 140 may then send a message containing the updated availability state information F5 to watcher service 150. An example message for conveying the updated availability state information is:

```
NOTIFY sip:user@watcherhost.example.com SIP/2.0
Via: SIP/2.0/TCP server.example.com;branch=z9hG4bKna998sk
From: <sip:resource@example.com>;tag=ffd2
To: <sip:user@example.com>;tag=xfg9
Call-ID: 2010@watcherhost.example.com
Event: availability
Subscription-State: active;expires=599
Max-Forwards: 70
CSeq: 8775 NOTIFY
Contact: sip:server.example.com
Content-Type: application/pidf+xml
Content-Length: ...
<?xml version="1.0" encoding="UTF-8"?>
<availability xmlns="urn:ietf:params:xml:ns:pidf"
    xmlns:im="urn:ietf:params:xml:ns:pidf:im"
    xmlns:myex="http://id.example.com/availability/"
    entity="pres:someone@example.com">
    <tuple id="bs35r9">
        <status>
            <basic>open</basic>
            <im:im>busy</im:im>
            <myex:location>home</myex:location>
        </status>
        <contact priority="0.8">im:someone@mobilecarrier.net</contact>
        <note xml:lang="en">Don't Disturb Please!</note>
        <note xml:lang="fr">Ne derangez pas, s'il vous plait</note>
        <timestamp>2001-10-27T16:49:29Z</timestamp>
    </tuple>
    <tuple id="eg92n8">
        <status>
            <basic>open</basic>
        </status>
        <contact priority="1.0">mailto:someone@example.com</contact>
```

-continued

```
    </tuple>
    <note>I'll be in Tokyo next week</note>
</availability>
```

As discussed before, the composite availability state is based on a user's availability intent, a user's availability desires, and/or an inferred availability state for the user. An availability intent expresses the user's mental attitude at a particular time (e.g., available, in a meeting, etc.) and may be explicitly stated by the user to update her availability state. Discreet availability states may only partially convey the availability of a user, however. Thus, system 100 allows a user to provide additional messages to cater to various state variations. For example, a user in a meeting could specify: i) in a meeting, but I can be interrupted; ii) in a meeting, but I can be reached by my team; or iii) in a meeting, and I cannot be interrupted.

Figure 3:
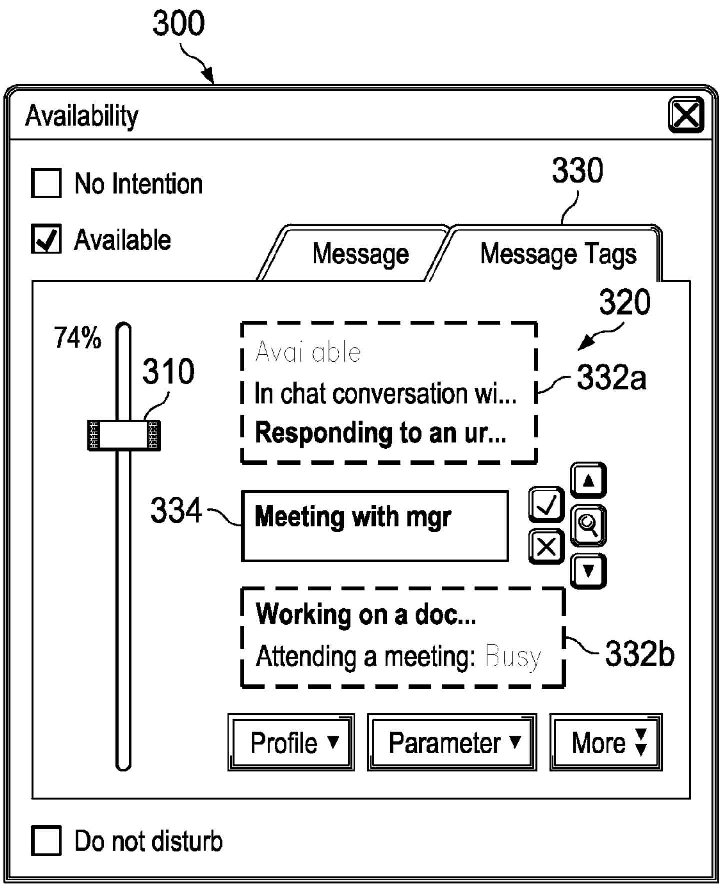
FIG. 3 is a drawing of an example user interface for presenting and indicating user availability information.

There may be gradations between these discreet states as well. In certain implementations therefore, system 100 may allow a user to specify availability intent with a greater degree of granularity. FIG. 3, for example, illustrates a user interface 300 including a slider 310 that allows a user to specify a percentage availability value. An example of values for an availability intent is shown by Table 1.

TABLE 1

| Availability intents value | Interpretation |
|---|---|
| 0 | Do-not-disturb |
| (0, 1] | Available. Defined by a two-digit decimal value in the range of 0 to 1, excluding 0 |
| −1 | Away from the Computer |
| −2 | No-intent |

Also as illustrated in FIG. 3, availability intent values may be associated with one or more message tags 320, which may be used to provide semantics for the availability values. The message tags, along with the associated availability values, may be shared with watcher services 150 (e.g., other Instant Messaging collaborators). The message tags may also augment the existing availability message text capability, provide parameterized messages, and/or be shared with other messaging entities (e.g., buddies). The availability service 130 can store the message tag(s) and the associated percentage value in a message tag map.

In FIG. 3, user interface 300 displays the message tags differently depending on the proximity of the currently selected availability percentage value. Thus, the percentage availability value associated with the message tags may be used to display the tags with varying emphasis, typically with the most emphasized message tags being the ones closer to the selected percentage availability value. The user can also directly select the message tag from the message tag list.

In general, message tag emphasis may be determined using a combination of text length, font size, and/or font color. In the illustrated example, the farther a message tag is from the selected percentage availability value, the message tag text is trimmed to fewer numbers of characters (followed with ellipses), reduced to a smaller font size, and faded to a different color (e.g., grey). Thus, the trim amount, the font size, and the font color may act as a visual cue regarding of how far the message tag is from the currently selected value. In addition, the message tags may displayed as be hyperlinked text, so that if the user selects a message tag, the corresponding percentage availability value is marked as selected.

As illustrated in FIG. 3, the message tags 320 are displayed in a window 330 that has a limited space. The window is divided into two regions 332. Region 332*a* is used to display the message tags that are on one side the availability value, and region 332*b* is used to display the message tags that are on the other side of the availability value. The untrimmed message tags may be listed in separate lines, one below another, and the trimmed message tags may be listed next to each other separated with a semi-colon. If the trim length is less than the length of the message tag, an ellipse ( . . . ) may be appended at the end of the trimmed message tag. If the trim-length is zero, the message tag may be replaced with a full-stop (.) character.

In particular implementations, a flattened Gaussian distribution curve may be used to map the trim length, font size, and font color. The font color may, for example, vary within a range $R_{SIZE}$ (e.g., {light grey, dark grey, and black}) that may be mapped to the percentage availability value (1 . . . 100) using the flattened Gaussian distribution as a mapping function. For example, if the currently selected percentage availability value is $X_{CUR}$, all the message tags up to a certain distance may be displayed in a specified font color (e.g., black), where $d=|X_{CUR}-X_{MTAG}|$. Example distance demarcations are shown in Table 2.

TABLE 2

| Distance (d) | Font Color |
|---|---|
| d > 37 | light-grey |
| 28 < d < 37 | light-grey + bold |
| 21 < d < 28 | dark-grey |
| 17 < d < 21 | dark-grey + bold |
| 11 < d < 17 | Black |
| d < 11 | black + bold |

Similarly, the font size may vary within a range $R_{FONT}$ (e.g., 14, 12, and 10 point), and the trim length may vary within a range $R_{TRIM}$ (e.g., 0, 4, and 8 characters), which may also mapped to the percentage availability value using a flattened Gaussian distribution as a mapping function. Example distance demarcations for font size and trim length are shown in Tables 3 and 4. These demarcations allow message tags that are closer to the selected percentage availability value to be presented in larger font and in more complete text, and the ones that are farther from the value are presented in smaller fonts and less complete text.

TABLE 3

| Distance (d) | Font Size |
|---|---|
| d > 27 | 4 |
| 21 < d < 27 | 6 |
| 15 < d < 21 | 8 |
| 11 < d < 15 | 10 |
| 6 < d < 11 | 12 |
| d < 6 | 14 |

TABLE 4

| Distance (d) | Trim Length |
|---|---|
| d > 41 | 0 |
| 31 < d < 41 | 2 |
| 27 < d < 31 | 4 |
| 24 < d < 27 | 6 |
| 21 < d < 24 | 8 |
| 19 < d < 21 | 10 |
| 17 < d < 19 | 12 |
| d < 17 | None |

An example algorithm to compute and prepare the message tags for display in user interface 300 is:

```
displayText1 := “”;
displayText2 := “”;
message tag := getFirstMessage(message tag-collection)
X_MTAG := getMessageAvailabilityPercentage(message
tag-collection, message tag)
While (message tag != null)
    d := |X_CUR − X_MTAG|
    F_SIZE := getSizeMapping(GD_SIZE, d)
    F_COLOR := getColorMapping(GD_COLOR, d)
    F_TRIM := getTrimLength(GD_TRIM, d)
    if(F_TRIM == −1)
        tagString := message tag
        else if(F_TRIM == 0)
            tagString := “.”
        else
            tagString := trim(message tag, F_TRIM) + ”...”
    hyperlinkedTag := prepareHyperlinkText(tagString, F_SIZE, F_COLOR)
    If(X_MTAG < X_CUR)
        if(F_TRIM != −1)
            displayText1 = ”;” + hyperlinkedTag
        else
            displayText1 = ”\n” + hyperlinkedTag
    else
        if(F_TRIM != −1)
            displayText2 = ”;” + hyperlinkedTag
        else
            displayText2 = ”\n” + hyperlinkedTag
    message tag := getNextMessage(message tag-collection)
    X_MTAG := getMessageAvailabilityPercentage(message
    tag-collection, message tag)
```

The output (i.e., displayText1 and displaytText2) from this algorithm is used to display the message tags above and below $X_{CUR}$. The list may be refreshed as slider 310 is moved. The text field displayed between displayText1 and displayText2 is used to display the message tag for $X_{CUR}$.

A user may also define new message tags with a percentage availability value. In the illustrated implementation, for example, the user may select a desired percentage availability value and enter (or over-write) the message tag in message tag field 334.

A user may also search for a message tag in the message tag collection. For example, in the illustrated implementation, a user may enter the keyword in tag field 334 and instruct the program to search for message tags with this keyword. The message tag with the selected keyword may be displayed in the tag field, with the corresponding percentage availability value displayed in slider 310.

In certain implementations, a user desiring to use message text, instead of percentage availability value and an associated message tag, may specify the same in a text field. The availability of the user may be marked as “Available” (equivalent to 100% available as the availability intent) with an independent message text for the watcher services 150.

System 100 also supports parameterized message tags. The values for the parameters used in a message tag may be dynamically obtained from elements of availability service 130 and/or user interface device 110. For example, while specifying a message tag (or message text), a user can use % parameters % in the message. Virtually any type of parameter that has an associated value in user interface device 110 or availability service 130 may be specified. Example parameters include % meeting title %, % meeting duration %, % meeting participants %, and % document title %. The available parameters, for example, may be provided to a user (e.g., through drop-down menu). When the message tag is published to the watcher, the % parameter % is replaced by the actual value.

In using system 100, a user may create a profile of message tags, which is a collection of message tags and their respective percentage availability values. Moreover, a user may create a message tag profile for different contexts (e.g., work, friends, family, etc.), and each profile may have its own different style (jargon, language, etc.) to express the semantics for the percentage availability value. A message tag profile may therefore be specified before selecting a message tag. Moreover, a message tag profile may be shared with and/or imported from other users (e.g., peers, team, social-network, etc.).

In a group environment, availability service 130 may manage multiple message tag profiles, and the user can choose different message tag profiles for different groups (e.g., buddy groups in an IM environment). The availability service 130 will use the appropriate message tag (for a given percentage availability-value) from the applicable message tag profile before responding to the user. Thus, different message tags (e.g., using different jargon, language, etc.) may express the semantics for the same percentage availability value for different individuals or groups (e.g., buddies, buddy lists, or watchers).

In order to share a message tag profile, a user may prepare an XML document with and send it to other users. An example schema is:

```
<?xml version=“1.0” encoding=“UTF-8”?>
<schema targetNamespace=“http://www.abc.com/MessageTagProfile”
elementFormDefault=“qualified”
xmlns=“http://www.w3.org/2001/XMLSchema”
xmlns:tns=“http://www.abc.com/ MessageTagProfile ” >
    <element name=“Originator” type=“string”></element>
    <element name=“CreationTime” type=“date”></element>
    <element name=“TagProfile”></element>
    <complexType name=“ MessageTagProfile ”>
        <sequence>
            <element name=“Title” type=“string”></element>
            <element name=“Tags” type=“tns:MessageTag”
        minOccurs=“0” maxOccurs=“unbounded”></element>
        </sequence>
    </complexType>
    <complexType name=“MessageTag”>
        <sequence>
        <element name=“AvailabilityPercentage”
        type=“int”></element>
        <element name=“TagString” type=“string”></element>
        </sequence>
    </complexType>
</schema>
```

The message tag profile may be saved as a text file in the receiver’s file system. On receiving a message tag profile, the user can import the message tag profile by selecting the XML document from the file-system. The user can further ‘Apply’ the currently selected message tag profile to a buddy group.

The Presence Information Data Format extension described in RFC 3863 may, for example, be used to transfer the additional availability information (e.g., percentage availability and the associated message tags). The resulting availability document may be similar to the following:

```
<?xml version="1.0" encoding="UTF-8"?>
    <impp:availability xmlns:impp="urn:ietf:params:xml:ns:pidf"
                xmlns:pex="http://www.abc.com/availability/extn"
                entity="pres:someone@abc.com">
        <impp:tuple id="ck38g9">
            <impp:status>
                    <impp:basic>open</impp:basic>
            </impp:status>
        <pex:availability percentage=74>
                        <pex:note>In a meeting with my Manager</pex:note>
            </pex:availability>>
            <impp:contact priority="0.65">tel:+09012345678</impp:contact>
        </impp:tuple>
    </impp:availability>
```

A user can also choose to display a message tag for a range of percentage availability. A distance allowance (DA) may also be expressed as percentage and will be used to select a message tag automatically from the message tag profile when an exact match is not available. For example, if the percentage availability value is 60%, there is no message tag available corresponding to 60%, and the DA is 5%, the availability service will choose a message tag in the range 57-63% closest to 60%. The percentage availability may, however, be displayed in terms of the actual availability.

When an associated user belongs to multiple groups, and the user assigns/configures different message tag profiles for them, then it is necessary for availability service 130 to resolve the conflict in displaying a single message from among multiple message tag profiles. The following process may be used to resolve the conflict:

Have the user define the primary group of the buddy, and hence the precedence of the associated user's group. By default, the group to which the associated user has been added recently is considered as the primary one.

If the user does not specify a primary group, the availability service may resolve the conflict through distance allowance (DA) among the message tags of the multiple profiles.

If the user has not specified a DA value, the availability service may identify the conflicts and display an error icon along with the associated user. The user can then manually resolve the conflict by choosing a message tag from one of the profiles.

The following logical sequence illustrates an example process for resolving a message tag profile conflict:

```
Let MP be the set of Message tag-profiles
Let M be the set of message tags
Let MTAG be a single message tag
Let X_CUR be the current percentage availability
Let X_MTAG be the percentage availability corresponding to MTAG
Let DA be the distance allowance
Let X_DA be the actual percentage allowance allowed by DA
for each IM Entity,
    MP := Choose all the message tag profiles associated with the IM Entity
    if (sizeOf MP = 1)
        if (There exists an MTAG in MP where X_CUR = X_MTAG)
            select MTAG for display
        else
            if (DA > 0)
                X_DA := (X_CUR * X_CUR) /100
                M := filter all message tags in all the profiles in the range between (X_CUR +
                X_DA) and (X_CUR + X_DA)
                if (sizeOf M = 1)
                    MTAG := M[1]
                    select MTAG for display
                else if (sizeOf M > 1)
                    MTAG := select the message tag from message tag profile corresponding
                    to the most recent group the IM Entity has been added.
                    select MTAG for display
        if (sizeOf MP > 1)
            MP := filter the primary group of the IM Entity
            if (sizeOf MP = 1)
                if (There exists an MTAG in MP where X_CUR = X_MTAG) select MTAG for
                display
            if (sizeOf MP = 0)
                MP := Choose all the message tag profiles associated with the IM Entity
                M := filter all message tags in all the profiles where (X_CUR = X_MTAG)
                if (sizeOf M = 1)
                    MTAG := M[1]
                    select MTAG for display
                else if (sizeOf M > 1)
                    MTAG := select the message tag from message tag profile corresponding
                    to the most recent group the IM Entity has been added.
                    select MTAG for display
                else if (sizeOf M = 0)
```

-continued

```
if (DA > 0)
    X_DA := (X_CUR * X_CUR)/100
    M := filter all message tags in all the profiles in the range between
    (X_CUR + X_DA) and (X_CUR + X_DA)
    if (sizeOf M = 1)
        MTAG := M[1]
        select MTAG for display
    else if (sizeOf M > 1)
        MTAG := select the message tag from message tag profile
        corresponding to the most recent group the IM Entity has been
        added.
        select MTAG for display
```

The message profile resolution preference can be set globally as well as at the individual watcher level. The settings at the watcher level may take precedence over the global settings.

In particular implementations, availability intent has the highest precedence in determining a user's composite availability state. In other words, the availability intent may directly and immediately affect the availability state published by availability service 130. The precedence of the availability intent may decline with time, however.

Figure 4:
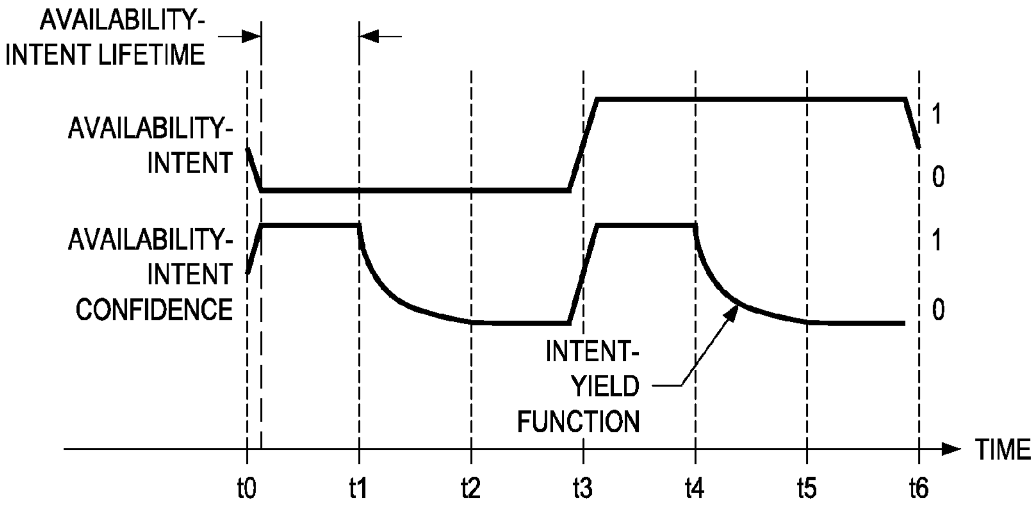
FIG. 4 is a graph illustrating an example process used in determining user availability information.

FIG. 4 illustrates a model for allowing the confidence in availability intent to decline with time. At time t0, a change in availability intents occurs (i.e., to 0). The availability intent is then given a high confidence value (i.e., 1) until a predetermined period of time (designated t1 in this example), at which point the confidence begins to decay to 0. At time t3, the user again specifies the availability intent, which resets the confidence to 1. The confidence then begins to decay again at time t4.

The availability state of the user will not necessarily change as the confidence diminishes. But availability service 130 may use the diminished confidence to respond to challenges from availability desire(s) and/or the inferred availability state.

Availability intent may therefore contribute the following elements to the availability determination:

- Availability intent: a value in the range of [0, 1]
- Message tag map: a table that maps the availability value to message tags
- Availability intent confidence: a confidence value in the range [0, 1] associated with the availability intent
- Availability intent lifetime: a duration for which the confidence is high
- Intent yield function: a function that determines the rate of change of confidence from high confidence to low-confidence These elements may, for example, be used when defining parameterized message tags. The parameters in the message could use the values held by these elements in the availability service. For instance, the elements related to the inferred availability state such as "meeting title", "meeting-duration" can be used to define message tags such as—"Am in a meeting—% meeting-title %, for % meeting-duration %." These elements may also be used for defining an availability desire. The expression used to state an availability desire, for instance, may use these elements as its parameters.

As discussed previously, availability desires are motivational attitudes of the user that represent wishes and wants and prohibitions and permissions. The desire(s) may be explicitly stated upfront by the user as a set of policies and rules, which may conflict with each other because these are only desires, as opposed to goals. For example, the user may state the following desires for her office hours: 1) D1: 75% available to associated users in the group {a, b, c, d, e, f}; and 2) D2: 10% available to associated user {e}. A conflict therefore exists with respect for the specific member {e}. In another example, the user may state the following desires while chairing a meeting (scheduled using Lotus Notes calendar, for example): 1) D3: 90% available to the all participants in the meeting; 2) D4: 10% available to others listed as instant messaging contacts/groups; and 3) D5: 0% available to the rest of the world. D3 and D4 may, for instance, be conflicting if a user is attending the meeting and is present in a group.

From the above examples, it can be observed that (a) the availability desire may be specified as a conditional algebraic expression for a target messaging entity; and (b) an availability desire may be valid only for a certain duration. Thus, the elements of an availability desire may include:

- Target messaging entity: identifies the target (e.g., associated user or group) for the availability desire.
- Event: specifies the trigger/signal for the availability desire. The event could be a timed-event (with a start-time and repeat-policy, for example) or action event (e.g., example, 'at the end of the meeting', 'when % target-IM-entity % is online', etc.).
- Condition: Specifies the conditional expression that if satisfied (e.g., evaluates to true), causes the evaluation of the algebraic expression to compute the availability state.
- Algebraic expression: evaluates to a number that represents the availability of the user for the associated user.
- Availability desire lifetime: defines the duration for which this availability desire is active.

The user could state more than one availability desire for an associated user. For example, an IM contact could belong to more than one group, and the availability desire defined for each group will be applicable to each member of the group. For a given IM Contact, each availability desire will evaluate into availability state values, which may conflict with each other, and it may be necessary to resolve this conflict, which will discussed below.

Additionally, a user may belong to more than one group (e.g., team or community). At any point in time, the user may be involved in an activity that is relevant to a certain group. For example, a user may be preparing the minutes-of-meeting, responding to a mail, contributing to a discussion in the team room, etc. The user may be obliged to be available to the members of these groups depending on the current activity (e.g., project status meeting). For example, the user may express the desire of being 90% available to attendees of the project status meeting and 10% available to the rest, for the duration of the meeting. In addition, the members in a group may play different roles—for example, in the project—team context, there are managers, team-members, subordinates, etc. The user may be obliged to be differently available to these members depending on their role in the team. These may be translated into availability desires too.

A user may update her availability desires through a user interface. System 100 may, for example, allow a user to visualize the availability desires that pertain to a selected watcher, support the definition of macro-level policies (such as priorities) on policy groups to help evaluate a composite availability state, and determining the composite availability state for each messaging entity using a system of algebraic expressions. A user interface may, for example, present desires for an entity using a context-sensitive pop-up menu that lists all the availability desires applicable for the selected entity. This list can be further filtered based on the choice of applicable duration (or lifetime). The user can choose to edit an existing availability desire or create a new one. If an existing availability desire is modified, and if the scope of applicability is wider than just the selected buddy/entity, then the user will be given the option to replace the existing one or save it as a new desire.

An availability desire may, for example, have the following constructs:

@Event(signal-definition)AND When(condition-expression)Availability(IM-Entity,Lifetime):=availability-expression Where, Event(signal-definition) represents the event-trigger used to compute the availability state
- Signal-definition is a logical expression, which when evaluated as true will fire the event.

condition-expression is a logical expression, which when evaluated to 'true' will cause the computation of availability-expression.

Availability(Entity, Lifetime) represents the availability of the selected Instant-Messaging Entity for the given lifetime.
- Entity is either one or more Contacts or a Group.
- Lifetime defines the duration for which the availability-value is valid availability-expression is an algebraic expression, which evaluates to a number.

A desire value may be interpreted as shown in Table 5.

TABLE 5

| Availability-Value | Interpretation |
|---|---|
| 0 | Do-not-disturb |
| (0, 1] | Available. Defined by a two-digit decimal value in the range of 0 to 1, excluding 0 |
| −1 | Away from the Computer |
| −2 | No-desire |

The parameters used while constructing the (conditional/algebraic) expressions in the availability desire may be as follows:

elements from the availability determination scheme and the related operations messaging entity (name or identity)
- String operations
- Regular-expressions agent probe parameter—such as date & time, calendar-entries, availability-value, etc., an elaborate list of agent probe parameters is provided in the later section of this document
- Date-time operations
- Numeric operations
- String operations The result of the availability expression may be used to map to a predefined parameterized message tag (as described in the availability intents) or to a predefined message text.

Typically, the precedence of an availability desire is specified by the user (as desire priorities or by choosing an agent, which is described below). And in the absence of a higher priority element, such as availability intent, the desire precedence directly affects the availability state published by availability service 130.

The resulting availability desire is associated with a certain degree of confidence, which is referred to as availability desire confidence. The confidence in availability desire will remain constant for a predetermined duration (as configured by the user) and will diminish subsequently. This duration is referred to as availability desire lifetime. Availability service 130 will use this confidence value to respond to challenges from the other elements of the availability determination scheme (namely, availability intent and/or inferred availability state). At the end of the availability desire lifetime, the availability desire confidence may diminish at a rate determined by a desire yield function. The availability state of the user will not necessarily be changed at the end of this duration, however, only the confidence will diminish. But if and when the availability desire is challenged by the other availability determination elements beyond the availability desire lifetime, it can yield.

The availability desire may contribute the following elements to the determination of the composite availability state:

Availability desire: a value in the range of [0, 1]

Signal definitions: a set of signals/triggers in the system

Availability desire condition: the condition in which the availability desire is applicable (and will be actuated with the occurrence of trigger event/signal)

Availability desire lifetime: the duration for which this availability desire is active Desire yield function Expressed desires may result in internal conflicts among the desires. That is, a user can upfront state multiple availability desires as a set of policies/rules that may conflict with each other. Conflicts between the availability desires may be detected: a) during availability state transitions triggered by elements of the composite availability determination scheme; or b) when a periodic availability state reconciliation (between the elements of the availability determination scheme) is triggered. These conflicts may be resolved using one or more of the following techniques: i) desire priorities/relative cost-of-satisfying the desire; ii) event priorities; iii) time ordering of the events; or iv) a composite approach.

A user may specify the priority of the availability desire, while creating a new availability desire, for example. The priority may be expressed as the "cost" incurred by the user if the desire/obligation is not satisfied. If the user does not specify a priority value, a default priority value may be used. In case of a conflict, the priority values are compared to determine which availability desire prevails. The following illustrates an algorithmic approach to revolve desire conflicts in an IM environment:

for each IM Entity,
- $x:=Choose all the availability desires associated with the IM Entity, which are valid at that instant
- if sizeOf $x is 1, the resulting availability state will be defined by this chosen availability desire.
- $x:=Filter $x and remove the availability desires that trigger a transition to 'no-desire'
- Sort $x by priority-values
- $x:=Choose the high priority ones
- if sizeOf $x is 1, the resulting availability state will be defined by this chosen availability desire.
- else
- return $x for the IM Entity This approach alone does not necessarily resolve all internal desire conflict situations, however. For example, in situations where the conflicting availability desires have equal priority values, this approach can be used to shortlist the top priority conflicting availability desires. The other techniques may, for example, be used to resolve the conflicts between the high priority internal desire conflicts.

A user may also specify priority values for the events that trigger the availability desires, and these priority values can also be used to resolve the internal desire conflicts. By default, all the events may be assigned an equal priority value. In case of a conflict, these priority values may be compared to determine which availability desire prevails.

This technique also does not necessarily resolve all internal desire conflict situations. For example, in situations where the conflicting availability desires are triggered by events with equally high priority values, this technique maybe be used to develop a shortlist of the conflicting availability desires. The other techniques may, for example, be used to resolve conflicts between these conflicting availability desires.

Using time ordering of events is based on the premise that the availability state change triggered by a recent event will have higher priority than the previous one. Thus, the order in which the events that generated the state change is used to prioritize the availability desire. This may be used in conjunction with the availability desire confidence to resolve conflicts.

A composite approach may take into account availability desire priorities, event priorities, and time ordering of events. A feature of this technique is that it can overcome conflicts even in situations where the availability desire priorities and/or the event priorities are not specified (typically assumed to be default values). An example schema for implementing a composite approach is:

for each IM Entity,
$x:=Choose all the availability desires associated with the IM Entity, which are valid at that instant
if sizeOf $x is 1, the resulting availability state will be defined by this chosen availability desire.
$x:=Filter $x and remove the availability desires that trigger a transition to 'no-desire'
Sort $x by priority-values
$x:=Choose the high priority ones
if sizeOf $x is 1, the resulting availability state will be defined by this chosen availability desire.
Sort $x by the priority-value of the events, which triggered these availability desires
$x:=Choose the high priority ones
if sizeOf $x is 1, the resulting availability state will be defined by this chosen availability desire.
$d:=Determine the duration for which the availability desire in $x is valid
Sort $x by $d
$x:=Choose the availability desire with the least value of $d.
The resulting availability state will be defined by this chosen availability desire.

Availability service 130 can determine an inferred availability state regarding the user based on informational attitudes that model the expected state of the world. That is, the availability service can determine the availability state based on the service's perception of the world and its relationship with the explicitly stated availability intent and availability desire(s). The state of the world is defined by the information collected by probes. The inferred availability state is based on the service's learning about the correlation between the perceived world state, determined availability desire state, and the explicitly stated availability intent.

The availability service 130 may determine an inferred availability state by periodically analyzing the usage of the personality computing environment, which includes system parameters, application parameters, collaboration parameters, collaboration intent (such as 'working on a mail', 'in a meeting', etc.), and the temporal data set to extract the usage patterns and the availability state change patterns. The availability service may also compute the percentage availability at regular intervals, provide up-to-date and parameterized messages with metadata and semantic information extracted from the active collaboration, prompt the user to change availability state non-intrusively, and announce activity-specific availability to collaborators.

In today's computing environment, a user may be working on multiple tasks with multiple degrees of effort at the same time. For example, a user may be involved in multiple collaboration activities, such as working with mails, working with shared documents/wiki, etc. The availability of such a user is dependent on the nature of involvement in these activities: 1) active participation, which typically requires frequent intervention (e.g., writing a document); 2) periodic participation, which typically involves periodic attention (e.g., subscription to a newsgroup for updates at regular intervals); 3) event-based participation, which typically requires infrequent intervention (e.g., revisiting a previously opened chat window and responding to a message); and/or 4) passive participation, which typically does not required much intervention (e.g., listening to a broadcast).

Moreover, a user may be contemporaneously using multiple versions of the same application. For example, a user may have more than one instant messaging application running simultaneously in multiple personality computing environments. However, depending on the nature of the activity, the user typically uses one of the many personality computing environments at a given point in time. This usage context could be used in a periodic manner to predict the availability.

The parameters of the usage context used to predict availability may include: 1) the nature of and number of applications/processes running in the personality computing environment; 2) the nature of, number of, and frequency of the active collaborations (e.g., authoring mail, responding to a mail, authoring documents, reviewing document, instant-chats, participating in a meeting, etc.); 3) the meta-data of the active collaborations (activity-title, meeting title, meeting duration, participants in conversation, title of document, etc.); 4) the importance associated with a certain collaboration activity (depending on the participants, collaboration context, etc.); 5) the depth of the collaboration queue; and/or 6) the number of passive collaborations, along with the activity level in these.

The inferred availability state model may be built as a decision tree that may be used to compute the "expected value", which is the inferred availability state of the user. Each node in the decision tree is tagged with a function f, which evaluates a certain aspect of the user's availability state. For example, a node can compute the "level of involvement in a chat conversation", "urgency in completing the activity/mail", "importance of the current meeting", etc. The child nodes contribute to the computation of the availability state.

In one mode of operation, the user chooses to install agent probes for various applications in the user's computing environment. Each agent probe is designed to collect data, which is used to compute the availability state using a decision tree template. Table 6 illustrates sample agent probes that can be used to collect information from a computing environment in a non-intrusive manner, with the consent of the user. Based on this information, the availability service will update the world state model.

TABLE 6

| Agent Probe | Metrics |
|---|---|
| OS probe | Collect information about the state of the OS<br>Active mode/Screen-saver mode<br>Number of active applications/process |
| System probe | Collect information about the state of the system<br>CPU utilization<br>Memory utilization<br>Network activity<br>Hard-disk activity |
| Mail application probe | Collect information about the Mail application<br>Mail Application in the foreground or background<br>Mail-activities<br>Reading a mail<br>Authoring a mail<br>Responding to a mail<br>Number of open mail<br>Names of the collaborators |
| Instant messaging probe | Collect information about the IM Application<br>Application in the foreground or background<br>IM-activities<br>In a meeting<br>In active conversation<br>Number of open IM windows<br>Names of the collaborators |
| Calendar probes | Collect information from the Calendar<br>Scheduled activity name<br>Names of collaborators<br>Duration<br>Location |
| Office application probe | Collect information about the Office Application<br>Application in the foreground or background<br>Application-activities<br>Reading office documents<br>Authoring office documents<br>Reviewing office document<br>Number of open Office documents |
| Web browser probe | Collect information about the web-browser<br>Brower application is in foreground or background<br>Number of browser window open<br>Number of pages browsed per unit-time<br>Nature of web-application<br>Mailing application<br>Stock-checking<br>Office application |

The information collected by the probe contributes to the leaf of a weighted decision tree. This weighted decision tree is the world-state model. The decision tree evaluates the availability state of the user based on the information periodically sensed by the active probes. The weight associated with each node in the decision tree reflects the confidence in the information collected by the probe. If any of the probes fails to respond, the weights may be redistributed to the other nodes in the decision tree.

Availability service 130 builds a composite inferred availability state model (e.g., decision tree) based on the information from the probes. For each active agent probe in the user's computing environment, a corresponding decision tree template is chosen. The composite inferred availability model is then constructed by merging these decision tree templates. While merging the decision trees, the root node will compute the composite availability state by finding the minimum of, maximum of, or average of all the availability states.

The user can subsequently refine the composite inferred availability state model with appropriate rules to compute the availability state. The user can choose to edit the decision tree by removing the nodes in the tree or by editing the parameters in the computation of availability state.

Figure 5:
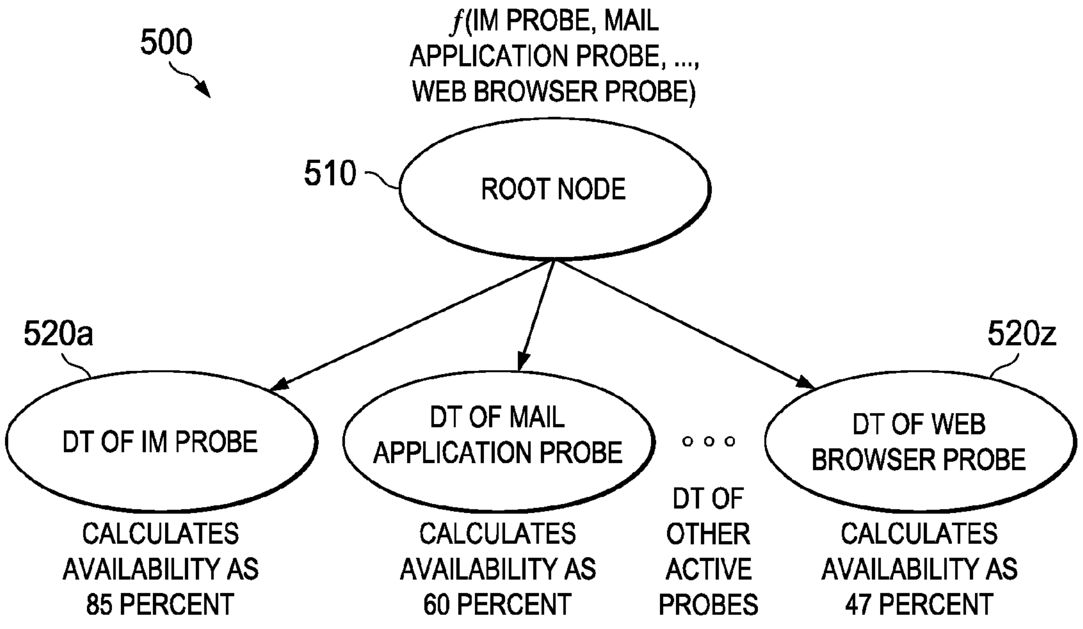
FIG. 5 is a diagram illustrating an example decision process used in determining user availability information.

FIG. 5 illustrates a sample decision tree 500. Decision tree 500 includes a root node 510 and its children nodes 520, which are each associated with a probe. When a probe becomes active, the corresponding tree may be attached as a child to the root node of the main decision tree. When a probe becomes inactive, the decision tree related to the corresponding probe may be deleted from the main decision tree. Thus, a decision tree may be made up of the root node and its children nodes, which are the decision trees corresponding to each of the active nodes.

Root node 510 is responsible for accurately inferring the availability state of a user. The data moves from a lower level to a higher level, and a function—$f(n)$—is applied at the higher level to get a collective result of the lower level. The function used at a higher level to combine the result of lower levels can be chosen by the user from the following set of functions—

Max of (Children node values)—chooses the max value from its children nodes

Min of (Children node values)—chooses the min value from its children node

Avg of (Children node values)—computes the average values of its children nodes

User defined function—user is given the freedom to define a function of her own (e.g., $f$(Children node values)=0.4*(Child node1 value)+0.25*(Child node2 value)+0.05*(Child node3 value)+0.3*(remaining child node values added))

In one mode of operation, the default function can be the Max of (Child node values) as the Function used to calculate the Value at a higher node.

A probe may be capable of collecting data from different clients, which may be associated with a sub-probe. A sub-probe may be responsible for collecting data from the corresponding client it is associated with. The sub-probe may collect data with respect to the corresponding client usage by the user and calculate the percentage availability by applying a function. The user can turn on or off a sub-probe of a client. By turning on a sub-probe, the corresponding decision tree template associated with the respective client may be added to the probe decision tree, and by turning off the sub-probe, the decision tree associated with the client may be deleted from the probe decision tree. The probe node, after collecting data from its children probe nodes, applies a function—$f1$(Active Sub-Probes values)—to calculate the percentage availability of the user. Function f1 can be similar to the ones for the probe nodes.

Figure 6:
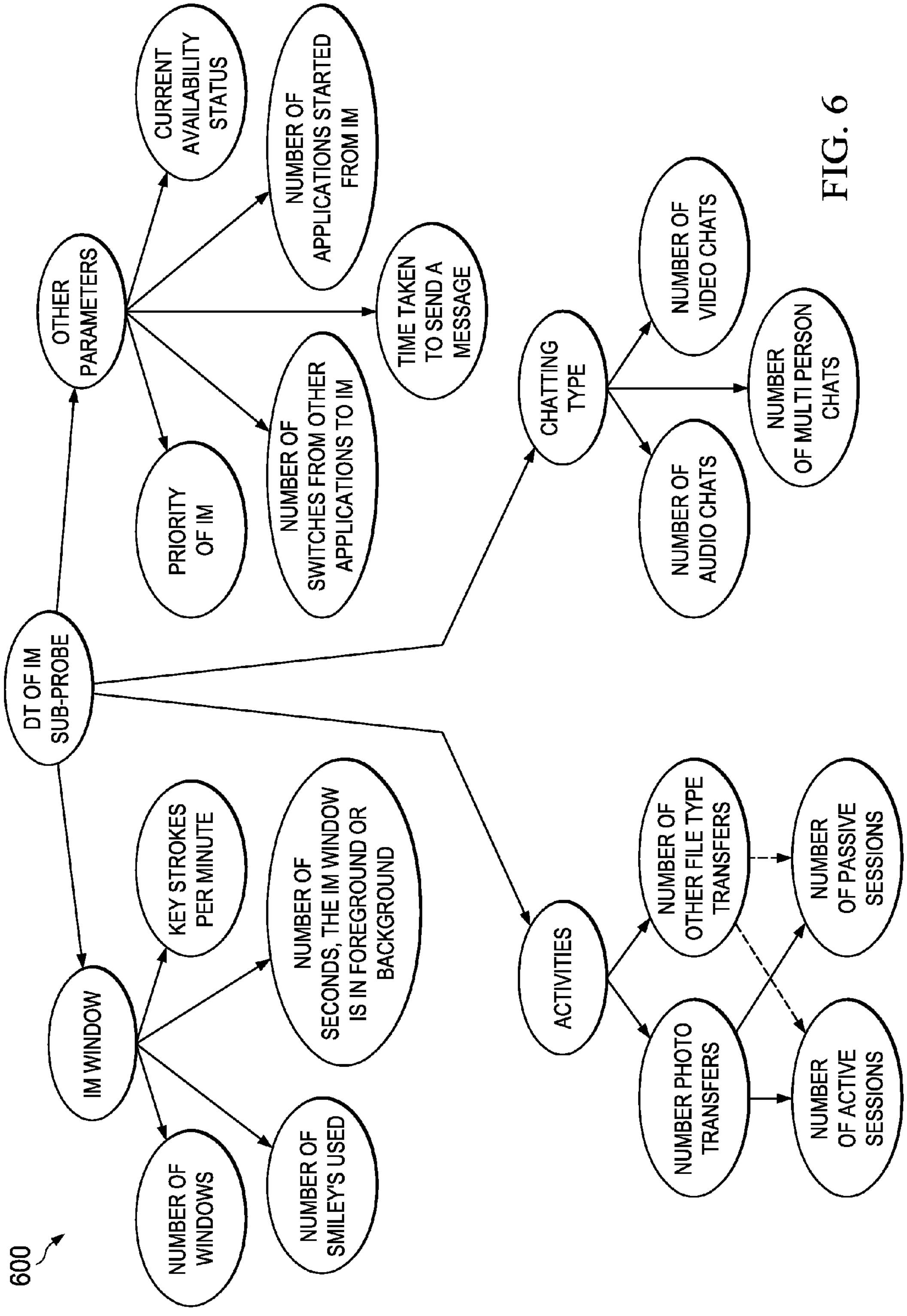
FIG. 6 is a diagram illustrating another example decision process used in determining user availability information.

FIG. 6 illustrates a decision tree 600 for an Instant Messenger (IM) sub-probe, such a probe for the IBM Lotus Sametime program. At level-0 of decision tree 600, is the IM sub-probe node, which is responsible for determining the percentage availability of a user based on the data collected with respect to the parameters defined in its lower levels (level-2 and level-3). A function—$f(n)$—is applied at the higher level to the data to get a collective result of the lower level. For example, in decision tree 600, "IM Window" is at level-1, and its children nodes are at level-2. When the probe collects data with respect to the parameters defined in level-2, a function $f1(n)$ is defined at the "IM Window" node that combines the data of level-2, and arrives at a single result for level-1. Function f(n) can be similar to the ones for the probe nodes.

The resulting inferred availability state may be expressed as a numerical value. Table 7 illustrates an example of the numerical values for inferred availability state.

TABLE 7

| Availability Belief Value | Interpretation |
|---|---|
| 0 | Do-not-disturb |
| (0, 1] | Available. Defined by a two-digit decimal value in the range of 0 to 1, excluding 0 |
| −1 | Away from the Computer |
| −2 | No-belief |

An inferred availability state does not automatically affect a change in the availability state. Rather, it may be used as a decision support system to prompt the user of any conflicts in the availability state (between the inferred availability state, the availability desire, and the availability intent) at regular intervals.

Typically, an inferred availability state has the lowest precedence. Thus, it challenges the composite availability state when there are no active availability intent and/or desires in order to move it to a predicted state.

Availability service 130 associates the inferred availability state with a certain degree of confidence (inferred availability confidence). The confidence in an inferred availability state may remain constant for a predetermined duration (inferred availability lifetime) and diminish subsequently. In the absence of a challenge from the other elements of the composite availability determination scheme (e.g., availability intent or availability desire(s)), inferred availability confidence may diminish beyond the inferred availability state lifetime at a rate defined by a function (inferred availability yield function). The composite availability state will not necessarily be changed as the confidence diminishes, however. If and when the inferred availability state is challenged by the other elements of the composite availability state determination scheme, it will yield since it is assigned the lowest priority.

An availability service agent may respond to queries from watcher service 150 and/or availability service 130. For example, a watcher service may inquire as to the current availability state of the user. Availability service 130 may, for instance, query regarding whether there is an availability state conflict for each contact in a buddy list, which may be periodically verified by the agent in order to prompt and resolve conflicts in the availability between the agent and the user.

The availability service agent may have to respond to queries with a partial availability determination. For example, the availability determination may include a) only the availability intent; b) the availability intent and availability desire(s); c) the availability intent and the inferred availability state; d) the availability desire and the inferred availability state; or e) the availability intent, the availability desire(s), and the inferred availability state.

Availability service 130 may also determine a composite availability state of a user. In one implementation, the availability state published by the availability service agent at instance t is a function of its components.

$$\text{avail-state}(t)=f(\text{avail-state}(t-1),\text{avail-intent}(t),\text{avail-intent-conf}(t),\text{avail-intent}(t-1),\text{inferred-avail-state}(t),\text{inferred-avail-conf}(t),\text{inferred-avail-state}(t-1),\text{avail-desire}(d1,t),\text{avail-desire-conf}(d1,t),\text{avail-desire}(d1,t-1),\ldots\ \text{avail-desire}(dn,t),\text{avail-desire-conf}(dn,t)\text{avail-desire}(dn,t-1))$$

where, avail-intent(t) represents a state transition (if any) in the availability-intent at the instance t;

avail-intent(t−1) represents the prior availability intents;

avail-belief(t) represents a state transition (if any) in the availability belief at the instance t;

avail-belief(t−1) represents the prior availability belief;

avail-desire(dn,t) represents a state transition (if any) in the availability desire dn at the instance t;

avail-desire(dn, t−1) represents the prior availability desire dn;

avail-intent-conf(t) represents the confidence of availability intention at time t;

inferred-avail-conf(t) represents the confidence of the inferred availability at time t;

avail-desire-conf(d1,t) represents the confidence of the availability desire d1 at time t; and avail-desire-conf(dn,t) represents the confidence of the availability desire do at time t.

Thus, there is a temporal interaction between the elements for determining the composite availability state. For a given watcher service 150—availability service 130 tuple, the availability service may determine the availability state based on the availability desires and the availability intents stated by the user and the inferred availability state determined by the availability service.

Figure 7:
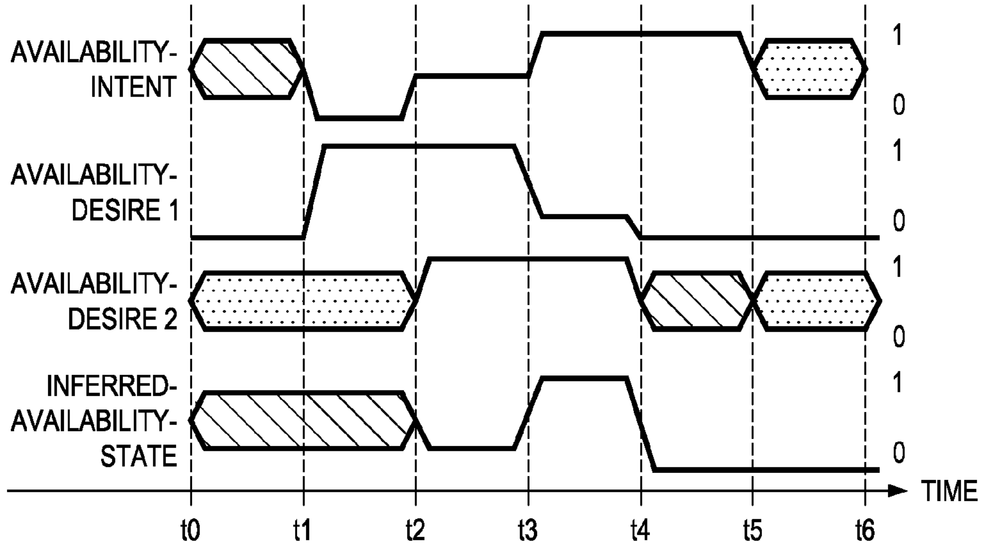
FIG. 7 is a graph illustrating an example process used in determining user availability information.

FIG. 7 illustrates an example relationship between availability intent, availability desires, and inferred availability. In the figure, the composite availability determination scheme includes an inferred availability state, two availability desires, and an availability intent. The availability state value range for the availability elements is (0, 1]. Table 8 illustrates the element values in FIG. 7.

TABLE 8

$$\text{availability intent} = \begin{cases} -1 & t_0 \le T < t_1 \\ 0 & t_1 \le T < t_2 \\ 0.5 & t_2 \le T < t_3 \\ 0.9 & t_3 \le T < t_5 \\ -2 & t_5 \le T \end{cases}$$

$$\text{availability desire 1} = \begin{cases} 0 & t_0 \le T < t_1 \\ 0.9 & t_1 \le T < t_3 \\ 0.2 & t_3 \le T < t_4 \\ 0 & T > t_4 \end{cases}$$

$$\text{inferred availability} = \begin{cases} -1 & t_0 \le T < t_2 \\ 0.2 & t_2 \le T < t_3 \\ 0.9 & t_3 \le T < t_4 \\ 0 & t_4 \le T \end{cases}$$

$$\text{availability desire 2} = \begin{cases} -2 & t_0 \le T < t_2 \\ 0.9 & t_2 \le T < t_4 \\ -1 & t_4 \le T < t_5 \\ -2 & t_5 \le T \end{cases}$$

Note that an availability value −1 is interpreted as unreachable (e.g., "Away from Computer"), 0 is interpreted as "Do not disturb", and −2 is interpreted as "No Desire", "No Inferred Availability State", or "No Intent."

Table 9 illustrates the availability state transition of an availability intent, where "NA" stands for "Not applicable" and "Yes" stand for "Transition is possible."

TABLE 9

| | Unreachable (−1) | Do-not-disturb (0) | No Intent (−2) | Available (%) |
|---|---|---|---|---|
| Unreachable (−1) | NA | Yes | Yes | Yes |
| Do-not-disturb (0) | Yes | NA | Yes | Yes |
| No Intent (−2) | Yes | Yes | NA | Yes |
| Available (%) | Yes | Yes | Yes | Yes |

As can be seen, the state can transition from any value to any value. The availability desire and inferred availability state may have a similar state transition model.

A number of conflicts can be observed between the elements in FIG. 7. For example, there are internal desire conflicts between availability desire 1 and availability desire 2, there are conflicts between availability desire and availability intent, there are conflicts between availability intents and inferred availability state, there are conflicts between availability desire and inferred availability state, and there are conflicts between availability desire, inferred availability state and availability intent.

Conflicts between inferred availability state and availability desires can be detected during: a) availability state transitions triggered by any of the elements of availability determination scheme; or b) periodic availability state reconciliation between the elements of the scheme. These conflicts could be resolved using a combination of: a) personality of the availability service; b) precedence of elements of the availability determination scheme; and/or c) dialogue between the availability service and the user.

Resolving conflicts between the availability intent, the availability desire, and the inferred availability state may be accomplished by an order of overruling. There are 12 possible overruling combinations—{BI, BD, ID, IB, DB, DI, BID, BDI, IDB, IBD, DBI, DIB}. These overruling combinations may also represent the personality traits exhibited by the user and/or availability service 130 while reasoning and resolving conflicts. For example, Table 10 illustrates different types of availability service characteristics.

TABLE 10

| Agent Type | Agent Attitude | Resulting Order |
|---|---|---|
| Realistic | Availability belief is predominant | BI, BD, BID, BDI |
| Stable | Availability intents overrules availability desire | ID, BID, IDB, IBD |
| Selfish | Availability desire overrules availability intents | DI, DBI, BDI, DBI, DIB |
| Extrovert | Maximizes availability | No particular order |
| Introvert | Minimizes availability | No particular order |

In particular modes of operation, the availability intent specified by the user is given a higher precedence than availability desire and availability belief. This reduces the overruling combinations—{ID, IB, IDB, IBD}. Moreover, since the availability desire is specified by the user, it can typically overrule an inferred availability state, which further reduces the overruling combinations—{ID, IB, IDB}. The other overruling combinations can also be used to resolve conflicts between the inferred availability state and availability desires. Once the user has chosen a personality type (and hence the overruling combinations), the conflicts can be resolved in a coarse-grained manner by applying the associated overruling combination.

The precedence of elements for the composite availability determination scheme can also be used to extend the overruling combination to make fine-grained decisions. The availability state transition of the availability service 130 is primarily governed by the availability intent state transitions triggered by the user. This is further influenced by the state transitions in the availability desire and the inferred availability state. During state transitions, the following precedence rules may be used:

1. An availability intent state transition to a valid state value has higher precedence over the prior availability desire and the prior inferred availability state.
2. An availability intent state transition to a valid state value has higher precedence over any simultaneous state transitions in the availability desire and/or inferred availability state.
3. An availability intent state transition to a 'no-intent' state value will trigger an evaluation of the prior availability desires and prior inferred availability state.
4. An availability intent state transition to a 'no-intent' state value will trigger an evaluation of simultaneous state transitions in the availability desires and/or inferred availability state.
5. An availability desire state transition to a valid state has lower precedence than a valid prior availability intent with a high availability intent confidence.
6. An availability desire state transition to a valid state has higher precedence than a valid prior availability intent with a lower availability intent confidence.
7. An availability desire state transition to a 'no-desire' state will trigger an evaluation of the prior availability intent, other prior availability desires and prior inferred availability state.
8. An availability desire state transition to a valid state (when the prior availability intent is 'no-intent') has higher precedence over prior inferred availability state.
9. An availability desire state transition to a valid state (when the prior availability intent is 'no-intent') has higher precedence over simultaneous state transitions in inferred availability state.
10. An availability desire state transition to a 'no-desire' state (when the prior availability intent is 'no-intent') will trigger the evaluation of simultaneous state transitions in inferred availability state and other simultaneous transitions of and prior availability desires.
11. An availability desire state transition to a valid state has equal precedence with another simultaneous transition of or prior availability desire. The availability desire confidence will decide the precedence these availability desires.
12. An inferred availability state transition to a valid state has lower precedence than a valid prior availability intent with a high availability intent confidence.
13. An inferred availability state transition to a valid state has higher precedence than a prior 'no intent' and 'no-desire' with a high/low availability intent confidence and high/low availability desire confidence respectively.

14. An inferred availability state transition to a valid state has equal precedence with a prior availability intent with a low availability intent confidence.
15. An inferred availability state transition to a valid state has lower precedence than a prior availability intent with a high availability intent confidence.
16. An inferred availability state transition to a valid state has lower precedence than a prior availability desire with high availability desire confidence.
17. An inferred availability state transition to a valid state has equal precedence with a prior availability desire with low availability desire confidence.
18. An inferred availability state transition to a 'no-belief' state will trigger an evaluation of a prior availability intent and prior availability desires.
19. An inferred availability state transition to a 'no-belief' state will trigger an evaluation of simultaneous state transition in availability intent and/or availability desires.
20. The availability intent state transition to a 'no-intent' state, with the other elements also (either in prior or) transitioning to 'no-belief' and 'no-desire' state, will result in no precedence conflict. The previous availability state will remain.
21. The availability desire state transition to a 'no-desire' state, with the other elements also (either in prior or) transitioning to 'no-belief' and 'no-intent' state, will result in no precedence conflict. The previous availability state will remain.
22. The inferred availability state transition to a 'no-belief' state, with the other elements also (either in prior or) transitioning to 'no-desire' and 'no-intent' state, will result in no precedence conflict. The previous availability state will remain.

With these precedence rules, the availability state transition of the availability service for a watcher service can be evaluated. When an equal precedence situation is encountered, however, the availability service may query the user to resolve the conflict.

Table 11 illustrates the interaction between state transitions in availability intent $A_i$, availability desire $A_d$, and inferred availability $I_a$. For example, $A_i$ can be involved in the following state/state transitions:

$$A_i:\{PS_{UDA}, PS_N, TS_{UDA}, TS_N\}$$

Where, $PS_{UDA}$: represents a non-transition from a previously valid state $PS_N$: represents a non-transition from a 'no intent' state $TS_{UDA}$: represents a transition from any state to a valid state $TS_N$: represents a transition from a valid state to a 'no intent' state A valid state is one of Unreachable (U), or Do-not-disturb (D), or Available (A).

Note that if the input combination evaluates to $A_{out}$, the previous availability state remains, and if $A_{out}$ is assigned as $A_d$, then the $A_{out}$ is the result of an evaluating the availability desires. Moreover, a state transition to a valid state in availability intent, availability desire, or inferred availability state will automatically assign the corresponding confidence as high.

TABLE 11

| $I_A$ | $A_d$/ Confidence | | $A_i$/ Confidence | | Resolved Availability |
|---|---|---|---|---|---|
| $PS_{UDA}$ | $PS_{UDA}$ | | $TS_{UDA}$ | | $A_i$ |
| $PS_{UDA}$ | $PS_{UDA}$ | High | $TS_N$ | | $A_d$ |
| $PS_{UDA}$ | $PS_{UDA}$ | Low | $TS_N$ | | $A_d$ |
| $PS_{UDA}$ | $PS_N$ | High | $TS_{UDA}$ | | $A_i$ |
| $PS_{UDA}$ | $PS_N$ | Low | $TS_{UDA}$ | | $A_i$ |
| $PS_{UDA}$ | $PS_N$ | | $TS_N$ | | $A_b$ |
| $PS_{UDA}$ | $TS_{UDA}$ | | $PS_{UDA}$ | High | Conflict |
| $PS_{UDA}$ | $TS_{UDA}$ | | $PS_{UDA}$ | Low | $A_d$ |
| $PS_{UDA}$ | $TS_{UDA}$ | | $PS_N$ | High | $A_d$ |
| $PS_{UDA}$ | $TS_{UDA}$ | | $PS_N$ | Low | $A_d$ |
| $PS_{UDA}$ | $TS_{UDA}$ | | $TS_{UDA}$ | | $A_i$ |
| $PS_{UDA}$ | $TS_{UDA}$ | | $TS_N$ | | $A_d$ |
| $PS_{UDA}$ | $TS_N$ | | $PS_{UDA}$ | High | $A_i$ |
| $PS_{UDA}$ | $TS_N$ | | $PS_{UDA}$ | Low | $A_i$ |
| $PS_{UDA}$ | $TS_N$ | | $PS_N$ | High | $A_b$ |
| $PS_{UDA}$ | $TS_N$ | | $PS_N$ | Low | $A_b$ |
| $PS_{UDA}$ | $TS_N$ | | $TS_{UDA}$ | | $A_i$ |
| $PS_{UDA}$ | $TS_N$ | | $TS_N$ | | $A_b$ |
| $PS_N$ | $PS_{UDA}$ | High | $TS_{UDA}$ | | $A_i$ |
| $PS_N$ | $PS_{UDA}$ | Low | $TS_{UDA}$ | | $A_i$ |
| $PS_N$ | $PS_{UDA}$ | High | $TS_N$ | | $A_d$ |
| $PS_N$ | $PS_{UDA}$ | Low | $TS_N$ | | $A_d$ |
| $PS_N$ | $PS_N$ | High | $TS_{UDA}$ | | $A_i$ |
| $PS_N$ | $PS_N$ | Low | $TS_{UDA}$ | | $A_i$ |
| $PS_N$ | $PS_N$ | High | $TS_N$ | | Conflict |
| $PS_N$ | $PS_N$ | Low | $TS_N$ | | Conflict |
| $PS_N$ | $TS_{UDA}$ | | $PS_{UDA}$ | High | Conflict |
| $PS_N$ | $TS_{UDA}$ | | $PS_{UDA}$ | Low | $A_d$ |
| $PS_N$ | $TS_{UDA}$ | | $PS_N$ | High | $A_d$ |
| $PS_N$ | $TS_{UDA}$ | | $PS_N$ | Low | $A_d$ |
| $PS_N$ | $TS_{UDA}$ | | $TS_{UDA}$ | | $A_i$ |
| $PS_N$ | $TS_{UDA}$ | | $TS_N$ | | $A_d$ |
| $PS_N$ | $TS_N$ | | $PS_{UDA}$ | High | $A_i$ |
| $PS_N$ | $TS_N$ | | $PS_{UDA}$ | Low | Conflict |
| $PS_N$ | $TS_N$ | | $PS_N$ | High | $A_{out}$ |
| $PS_N$ | $TS_N$ | | $PS_N$ | Low | $A_{out}$ |
| $PS_N$ | $TS_N$ | | $TS_{UDA}$ | | $A_i$ |
| $PS_N$ | $TS_N$ | | $TS_N$ | | $A_{out}$ |
| $TS_{UDA}$ | $PS_{UDA}$ | High | $PS_{UDA}$ | High | $A_i$ |
| $TS_{UDA}$ | $PS_{UDA}$ | Low | $PS_{UDA}$ | High | $A_i$ |
| $TS_{UDA}$ | $PS_{UDA}$ | High | $PS_{UDA}$ | Low | $A_d$ |
| $TS_{UDA}$ | $PS_{UDA}$ | Low | $PS_{UDA}$ | Low | Conflict |
| $TS_{UDA}$ | $PS_{UDA}$ | High | $PS_N$ | High | $A_d$ |
| $TS_{UDA}$ | $PS_{UDA}$ | Low | $PS_N$ | High | Conflict |
| $TS_{UDA}$ | $PS_{UDA}$ | High | $PS_N$ | Low | $A_d$ |
| $TS_{UDA}$ | $PS_{UDA}$ | Low | $PS_N$ | Low | Conflict |
| $TS_{UDA}$ | $PS_{UDA}$ | | $TS_{UDA}$ | | $A_i$ |
| $TS_{UDA}$ | $PS_{UDA}$ | High | $TS_N$ | | $A_d$ |
| $TS_{UDA}$ | $PS_{UDA}$ | Low | $TS_N$ | | Conflict |
| $TS_{UDA}$ | $PS_N$ | High | $PS_{UDA}$ | High | $A_i$ |
| $TS_{UDA}$ | $PS_N$ | Low | $PS_{UDA}$ | High | $A_i$ |
| $TS_{UDA}$ | $PS_N$ | High | $PS_{UDA}$ | Low | Conflict |
| $TS_{UDA}$ | $PS_N$ | Low | $PS_{UDA}$ | Low | Conflict |
| $TS_{UDA}$ | $PS_N$ | High | $PS_N$ | High | $A_b$ |
| $TS_{UDA}$ | $PS_N$ | Low | $PS_N$ | High | $A_b$ |
| $TS_{UDA}$ | $PS_N$ | High | $PS_N$ | Low | $A_b$ |
| $TS_{UDA}$ | $PS_N$ | Low | $PS_N$ | Low | $A_b$ |
| $TS_{UDA}$ | $PS_N$ | High | $TS_{UDA}$ | | $A_i$ |
| $TS_{UDA}$ | $PS_N$ | Low | $TS_{UDA}$ | | $A_i$ |
| $TS_{UDA}$ | $PS_N$ | High | $TS_N$ | | $A_b$ |
| $TS_{UDA}$ | $PS_N$ | Low | $TS_N$ | | $A_b$ |
| $TS_{UDA}$ | $TS_{UDA}$ | | $PS_{UDA}$ | High | $A_i$ |
| $TS_{UDA}$ | $TS_{UDA}$ | | $PS_{UDA}$ | Low | $A_d$ |
| $TS_{UDA}$ | $TS_{UDA}$ | | $PS_N$ | High | $A_d$ |
| $TS_{UDA}$ | $TS_{UDA}$ | | $PS_N$ | Low | $A_d$ |
| $TS_{UDA}$ | $TS_{UDA}$ | | $TS_{UDA}$ | | $A_i$ |
| $TS_{UDA}$ | $TS_{UDA}$ | | $TS_N$ | | $A_d$ |
| $TS_{UDA}$ | $TS_N$ | | $PS_{UDA}$ | High | $A_i$ |
| $TS_{UDA}$ | $TS_N$ | | $PS_{UDA}$ | Low | $A_b$ |
| $TS_{UDA}$ | $TS_N$ | | $PS_N$ | High | $A_b$ |
| $TS_{UDA}$ | $TS_N$ | | $PS_N$ | Low | $A_b$ |
| $TS_{UDA}$ | $TS_N$ | | $TS_{UDA}$ | | $A_i$ |
| $TS_{UDA}$ | $TS_N$ | | $TS_N$ | | $A_b$ |
| $TS_N$ | $PS_{UDA}$ | High | $PS_{UDA}$ | High | $A_i$ |
| $TS_N$ | $PS_{UDA}$ | Low | $PS_{UDA}$ | High | $A_i$ |
| $TS_N$ | $PS_{UDA}$ | High | $PS_{UDA}$ | Low | $A_d$ |
| $TS_N$ | $PS_{UDA}$ | Low | $PS_{UDA}$ | Low | Conflict |

TABLE 11-continued

| $I_A$ | $A_d$/ Confidence | | $A_i$/ Confidence | | Resolved Availability |
|---|---|---|---|---|---|
| $TS_N$ | $PS_{UDA}$ | High | $PS_N$ | High | $A_d$ |
| $TS_N$ | $PS_{UDA}$ | Low | $PS_N$ | High | Conflict |
| $TS_N$ | $PS_{UDA}$ | High | $PS_N$ | Low | $A_d$ |
| $TS_N$ | $PS_{UDA}$ | Low | $PS_N$ | Low | Conflict |
| $TS_N$ | $PS_{UDA}$ | High | $TS_{UDA}$ | | $A_i$ |
| $TS_N$ | $PS_{UDA}$ | Low | $TS_{UDA}$ | | $A_i$ |
| $TS_N$ | $PS_{UDA}$ | High | $TS_N$ | | $A_d$ |
| $TS_N$ | $PS_{UDA}$ | Low | $TS_N$ | | $A_d$ |
| $TS_N$ | $PS_N$ | | $PS_{UDA}$ | High | $A_i$ |
| $TS_N$ | $PS_N$ | | $PS_{UDA}$ | Low | $A_{out}$ |
| $TS_N$ | $PS_N$ | High | $PS_N$ | High | $A_{out}$ |
| $TS_N$ | $PS_N$ | Low | $PS_N$ | High | $A_{out}$ |
| $TS_N$ | $PS_N$ | High | $PS_N$ | Low | $A_{out}$ |
| $TS_N$ | $PS_N$ | Low | $PS_N$ | Low | $A_{out}$ |
| $TS_N$ | $PS_N$ | High | $TS_{UDA}$ | | $A_i$ |
| $TS_N$ | $PS_N$ | Low | $TS_{UDA}$ | | $A_i$ |
| $TS_N$ | $PS_N$ | High | $TS_N$ | | $A_{out}$ |
| $TS_N$ | $PS_N$ | Low | $TS_N$ | | $A_{out}$ |
| $TS_N$ | $TS_{UDA}$ | | $PS_{UDA}$ | High | $A_i$ |
| $TS_N$ | $TS_{UDA}$ | | $PS_{UDA}$ | Low | $A_d$ |
| $TS_N$ | $TS_{UDA}$ | | $PS_N$ | High | $A_d$ |
| $TS_N$ | $TS_{UDA}$ | | $PS_N$ | Low | $A_d$ |
| $TS_N$ | $TS_{UDA}$ | | $TS_{UDA}$ | | $A_i$ |
| $TS_N$ | $TS_{UDA}$ | | $TS_N$ | | $A_d$ |
| $TS_N$ | $TS_N$ | | $PS_{UDA}$ | High | $A_{out}$ |
| $TS_N$ | $TS_N$ | | $PS_{UDA}$ | Low | $A_{out}$ |
| $TS_N$ | $TS_N$ | | $PS_N$ | High | $A_{out}$ |
| $TS_N$ | $TS_N$ | | $PS_N$ | Low | $A_{out}$ |
| $TS_N$ | $TS_N$ | | $TS_{UDA}$ | | $A_i$ |
| $TS_N$ | $TS_N$ | | $TS_N$ | | $A_{out}$ |

Figure 8:
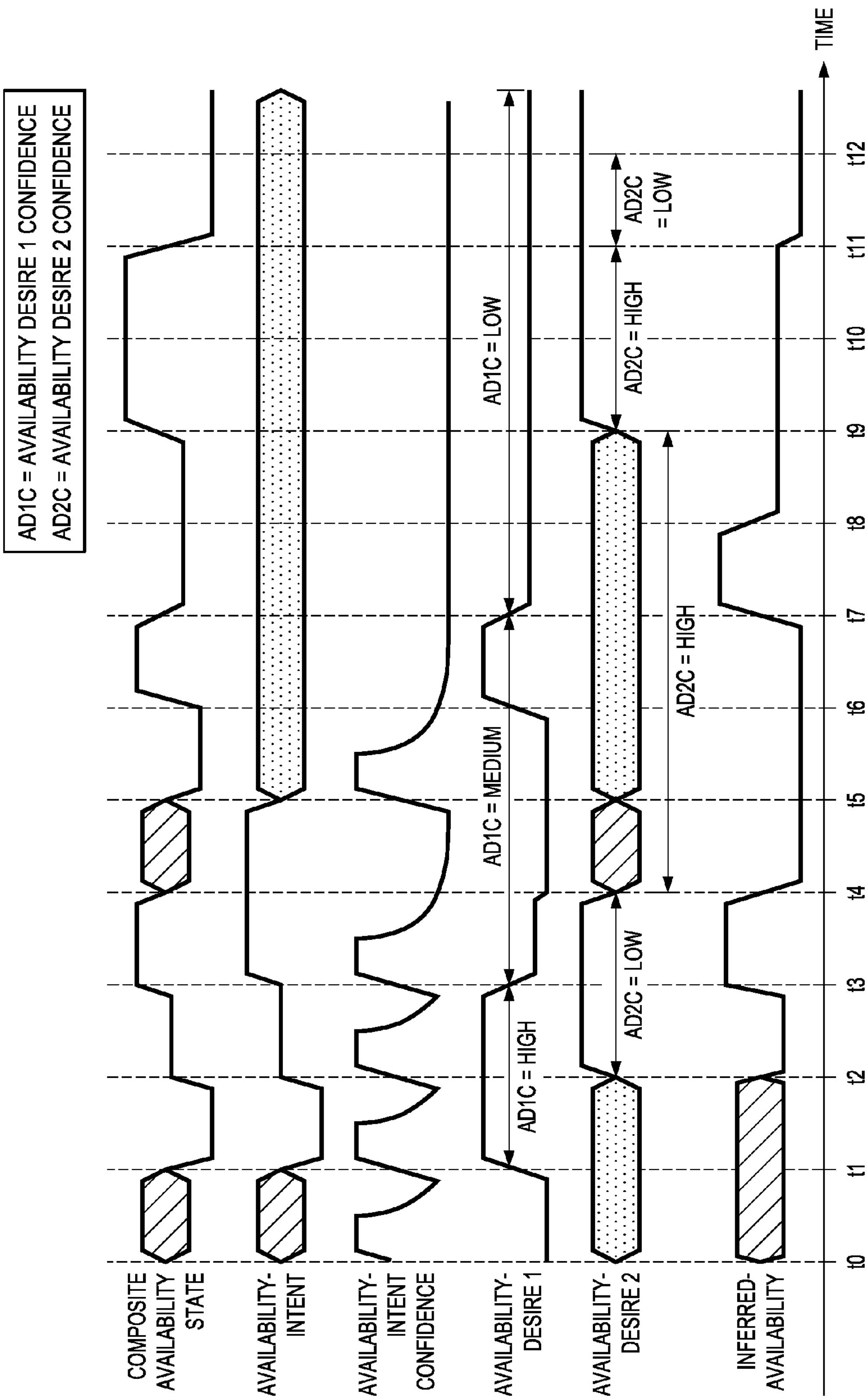
FIG. 8 is a graph illustrating an example process used in determining user availability information.

FIG. 8 illustrates a determination of composite availability state at a transition based on an availability intent, an availability intent confidence, two availability desires, and an inferred availability state. The dotted boxes in the illustration image represent "No Intent" or "No Desire" (e.g., state −2), and the hashed boxes represent "Unreachable" or "Away from Computer" (e.g., state −1).

At t0, the availability state is governed by the availability intent. At t1, t2 and t3, the state transition made by the availability intent governs the availability state. At t4, the state transition made by the availability desire 1, availability desire 2, and availability belief does not match with the current availability state and availability intent, and since the availability intent confidence is low, availability desire will prevail. And because availability desire 2 has higher priority than availability desire 1, availability desire 2 will govern the availability state. At t5, the state transition made by the availability intent to "no intent" will trigger the evaluation of the availability desires and the inferred availability. The prior availability desires have a higher precedence than prior inferred availability state. The transition of availability desire 2 to "no-desire" triggers the evaluation of prior inferred availability state and availability desire 1, and the availability desire 1 prevails. Availability desire 1 prevails until t9, at which point availability desire 2 prevails. At t11, the inferred availability prevails.

The availability state of a user is also reconciled periodically whenever there are no state transitions in the availability intent over a duration span. In this scenario, it is assumed that the user is intentionally or unintentionally not updating the availability intent explicitly, and the user is expecting the availability service to update the availability state based on the availability desires and the inferred availability state. During composite availability state reconciliation, the following precedence rules may be used:

1. A valid prior availability desire has lower precedence than a valid prior availability intent with a high availability intent confidence.
2. A valid prior availability desire state has higher precedence than a 'no intent' prior availability intent with a high availability intent confidence.
3. A valid prior availability desire state with a high availability desire confidence has higher precedence over a prior availability intent with low availability intent confidence.
4. A valid prior availability desire state with a low availability desire confidence has a lower precedence than a prior availability intent with low availability intent confidence.
5. A valid prior inferred availability state has lower precedence than a valid prior availability intent with a high availability intent confidence.
6. A valid prior inferred availability state has lower precedence over a prior availability intent with low availability intent confidence.
7. A valid prior availability desire state has higher precedence over a prior inferred availability state.
8. A valid prior availability desire can compete with another valid prior availability desire, and the precedence is decided by their respective availability desire confidence values.
9. A prior availability intent has a higher precedence if the availability desire is 'no-desire' and inferred availability state is 'no-belief'.

Table 12 illustrates resolution for various combinations when a) there are no transitions in the availability intent over a long duration, which is customizable; b) the user is intentionally or unintentionally not updating the availability state explicitly; and c) the user is expecting the availability service to reconcile and update the composite availability state based on the availability desires and the inferred availability state. $PS_{UDA}$ indicates that the previous state is "Unreachable" (U), or "Do-not-disturb" (D), or "Available" (A), and $PS_N$ indicates that the previous state is "No Intent", "No Desire", or "No-belief."

TABLE 12

| Inferred Availability State ($I_A$) | Availability Desire ($A_d$) & confidence | | Availability intents ($A_i$) & confidence | | Determined Availability |
|---|---|---|---|---|---|
| $PS_{UDA}$ | $PS_{UDA}$ | High | $PS_{UDA}$ | High | $A_i$ |
| $PS_{UDA}$ | $PS_{UDA}$ | Low | $PS_{UDA}$ | High | $A_i$ |
| $PS_{UDA}$ | $PS_{UDA}$ | High | $PS_{UDA}$ | Low | $A_d$ |
| $PS_{UDA}$ | $PS_{UDA}$ | Low | $PS_{UDA}$ | Low | Conflict |
| $PS_{UDA}$ | $PS_{UDA}$ | High | $PS_N$ | | $A_d$ |
| $PS_{UDA}$ | $PS_{UDA}$ | Low | $PS_N$ | | $A_d$ |
| $PS_{UDA}$ | $PS_N$ | High | $PS_{UDA}$ | High | $A_i$ |
| $PS_{UDA}$ | $PS_N$ | Low | $PS_{UDA}$ | High | $A_i$ |
| $PS_{UDA}$ | $PS_N$ | High | $PS_{UDA}$ | Low | $A_i$ |
| $PS_{UDA}$ | $PS_N$ | Low | $PS_{UDA}$ | Low | Conflict |
| $PS_{UDA}$ | $PS_N$ | High | $PS_N$ | | $A_b$ |
| $PS_N$ | $PS_{UDA}$ | High | $PS_{UDA}$ | High | $A_i$ |
| $PS_N$ | $PS_{UDA}$ | Low | $PS_{UDA}$ | High | $A_i$ |
| $PS_N$ | $PS_{UDA}$ | High | $PS_{UDA}$ | Low | $A_d$ |
| $PS_N$ | $PS_{UDA}$ | Low | $PS_{UDA}$ | Low | Conflict |
| $PS_N$ | $PS_{UDA}$ | High | $PS_N$ | | $A_d$ |
| $PS_N$ | $PS_{UDA}$ | Low | $PS_N$ | | $A_d$ |
| $PS_N$ | $PS_N$ | High | $PS_{UDA}$ | High | $A_i$ |
| $PS_N$ | $PS_N$ | Low | $PS_{UDA}$ | High | $A_i$ |
| $PS_N$ | $PS_N$ | High | $PS_{UDA}$ | Low | $A_i$ |
| $PS_N$ | $PS_N$ | Low | $PS_{UDA}$ | Low | $A_i$ |
| $PS_N$ | $PS_N$ | High/ Low | $PS_N$ | | Conflict |

The example state transition rules do not completely resolve all the conflicts that exist between the inferred availability state and availability desires in all situations. Resolution in these instances can, for instance, be solved by querying with the user. For example, the user may be prompted for an availability intent. The prompt may include the prior composite availability state and the conflicting triggering elements of the availability determination scheme, where a triggering element is the transitioning of the element of availability determination scheme. For example, if the composite availability state is "Available" and the user is joining a meeting (as the Chair), then the availability service may challenge the current collaboration intent by prompting the user to change availability state to "In a meeting" and reduce the availability to a lower value. The sequence may then call for waiting a predefined duration for a response from the user. If the user responds with an availability intent, the agent may evaluate the composite availability state using the updated element. If an availability determination element changed within the waiting period, the agent may reevaluate the availability state based on the new element. If the user does not respond during the duration, the service may use the overruling combination determined by the service personality to modify the availability state. The personality of the service is modifiable by the user, so that the user can define a new overruling combination.

In certain implementations, availability service 130 may be an intelligent software agent, which means that is has the ability to adapt and learn. There are various types of agents, such as reflex agents, which percept through sensors and act through actuators, and temporal agents, which use temporal/historic information while responding to program inputs or while adjusting its next behavior. Mathematically, a simple agent program maps possible percept sequences to possible actions that can be directly or indirectly (by modifying the feedback function or its coefficient) performed by the agent—$f:P^* \rightarrow A$. Agents can be classified based on their degree of perceived intelligence and capability:

1. Simple reflex agents—act on the basis of the current perception. The agent function is based on the event-condition-action. This agent function succeeds when the environment is fully observable. Some reflex agents can also contain information on their current state, which allows them to disregard conditions whose actuators are already triggered.
2. Model-based reflex agents—handle partially observable environments. The current state is stored in a data structure that describes the unseen part of the world. This behavior requires information on how the world behaves and works. This additional information completes the world-view model.
3. Goal-based agents—model-based agents that store information regarding situations that are desirable. This allows the agent to choose the path that reaches a goal state (from multiple possibilities).
4. Utility-based agents—goal-based agents that can distinguish between goal states and non-goal states. It uses a utility function to define a measure of how desirable a particular state is.
5. Learning agents—autonomous agents that can learn and adapt to changing circumstances. They exhibit the following characteristics:
   - learn quickly from large amounts of data
   - learn and improve through interaction with the environment
   - adapt online and in real-time
   - have memory based exemplar storage and retrieval capacities
   - have parameters to represent short and long term memory (mechanisms to forget, etc.)
   - accommodate new problem solving rules incrementally
   - analyze itself in terms of behavior, error and success In particular implementations, an agent that is situated (e.g., embedded in its environment), goal directed (e.g., has goals that it tries to achieve), reactive (e.g., reacts to changes in its environment), and social (e.g., can communicate with other agents, including humans) may be used.

An availability service may be evaluated in many ways. For example, the service may be evaluated based on its accuracy of predicting the current availability of a user, measured by number of false-positives, and the accuracy of predicting the availability state changes, measured by the number of false positives. Additionally, the availability service may be evaluated based on the extent of non-intrusiveness and the ability to gracefully resolve differences in the inferred availability state of the user and the actual availability state.

System 100 provides a variety of features. For example, the system is able to convey availability information regarding a user for messaging applications (e.g., Instant Messaging and e-mail) and for collaboration infrastructures (e.g., tearooms, document-library, wiki, etc.). And while the system may accurately convey an availability state for a user when the user declares her intent, the system is also able to convey a relatively accurate availability state when the user has not declared her intent and/or has not declared her intent for a long period of time, especially when other factors indicate she may have a different availability. Thus, a more accurate availability state may be presented to those interested in communicating with the user, which can result in people having their needs met by being able to communicate with the user when she is available while not disturbing the user when she does not want to be disturbed. Moreover, the system may allow the user to more accurately select her availability intent and convey this to associated users, which may allow communication with the user even when she is not entirely available (e.g., when they can be reached for some issues but not others). Thus, people that want to communicate with a user can determine the appropriate manner in which to do so.

Additionally, the composite availability state of the user may be presented differently depending on which type of person is interested in communicating with the user (e.g., supervisors, co-workers, team members, family, and friends). Thus, a user may only receive communications through available techniques from people that are of current interest to the user.

Moreover, the availability information presented to the associated user may include granular information regarding the user's availability. For example, the information could include the user's availability with a percentage value, which could be represented by a numerical value or a color. As another example, the information could include a message parameterized with meta-data extracted from collaboration. Thus, a receiving user will understand the context within which the user of interest is available.

Furthermore, system 100 may provide activity-specific availability to collaborators. For example, if the user is working on an activity that involves collaboration with a group of people (defined explicitly in a messaging environment, implicitly by analyzing previously exchanged messages, etc.), the availability state presented group members may be higher than the availability state presented to others.

Figure 9:
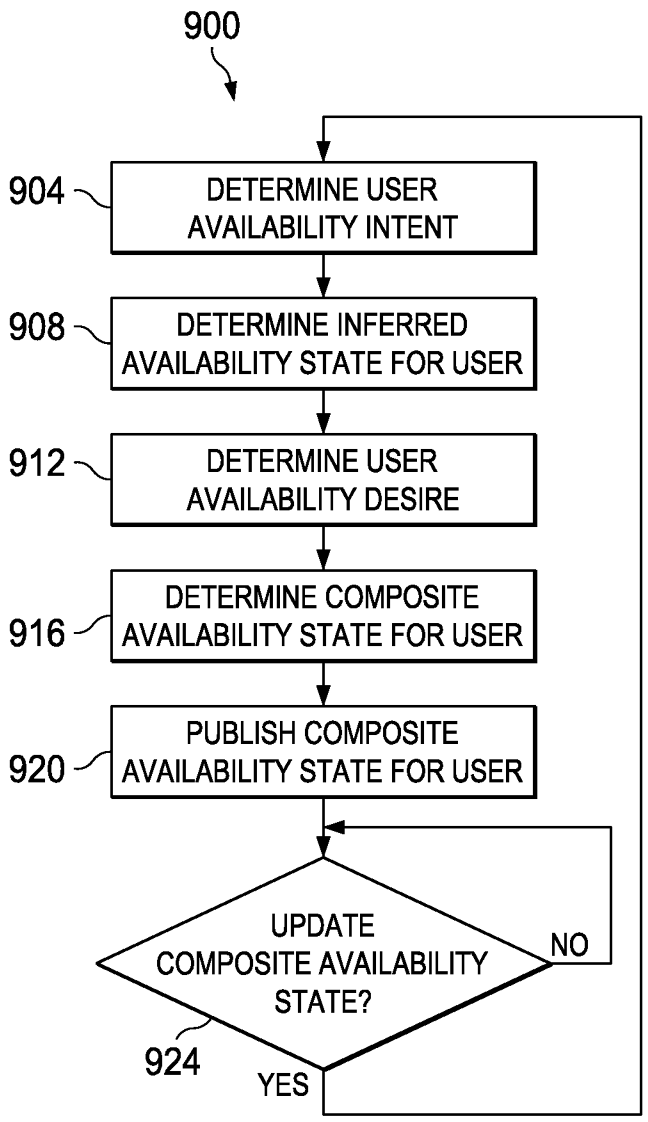
FIG. 9 is a flowchart illustrating an example process for user determining availability information.

FIG. 9 illustrates a process 900 for determining and conveying user availability. Process 900 may, for example, be implemented by an availability service located on a user interface device or a server system.

Process 900 calls for determining a user's availability intent (operation 904). A user's availability intent may, for example, have been recently indicated by a user or indicated by the user in the past, in which case, the availability intent may have a confidence factor associated therewith.

Process 900 also calls for determining an inferred availability state for the user (operation 908). The inferred availability state may, for example, be based on the user's interaction with her computing environment. The inferred availability state may have a recent transition at the time of the determination or be based on a history of use.

Process 900 additionally calls for determining the user's availability desire (operation 912). A user's availability desire may, for example, be based on one or more availability desires expressed by a user. Moreover, determining a user's availability desire may involve resolving conflicting availability desires for the user.

Process 900 further calls for determining a composite availability state for the user (operation 916). The composite availability state may, for example, be based on analyzing the user's availability intent (along with any confidence), the inferred availability state for the user (along with any confidence), and one or more availability desires of the user (along with any confidences). Conflicts among and/or between these elements may, for example, be resolved based on priorities. Move over, one or more of these elements may have undergone a transition at the time of the determination, which may be factored into determining the composite availability state.

Process 900 also calls for conveying the composite availability state (operation 920). The composite availability state may, for example, be published to a server system that tracks users watching the availability state of the user. The server system may convey the availability state to the watchers.

Process 900 additionally calls for determining whether to update the composite availability state (operation 924). The composite availability state may, for example, be updated at periodic intervals or based on a transition of one or more of the elements. Once the composite availability state should be updated, process 900 calls for again determining an availability intent, an inferred availability state, and an availability desire for the user and determining a composite availability state (operations 904, 908, 912, and 916).

Although FIG. 9 illustrates one example of a process for determining and conveying user availability, other processes for determining and conveying user availability may have fewer, additional, and/or a different arrangement of operations. For example, some processes may not include determining an inferred availability state for a user. As another example, some processes may include conveying different availability information (e.g., state and message) based on the relationships of users associated with the user whose availability state is being determined.

The flowchart and block diagrams in the figures illustrate the architecture, functionality, and operation of systems, methods, and computer program products of various implementations of the disclosure. In this regard, each block in the flowchart or block diagrams may represent a module, segment, or portion of code, which can include one or more executable instructions for implementing the specified logical function(s). It should also be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or the flowchart illustration, and combination of blocks in the block diagrams and/or flowchart illustration, can be implemented by special purpose hardware-based systems the perform the specified function or acts, or combinations of special purpose hardware and computer instructions.

Figure 10:
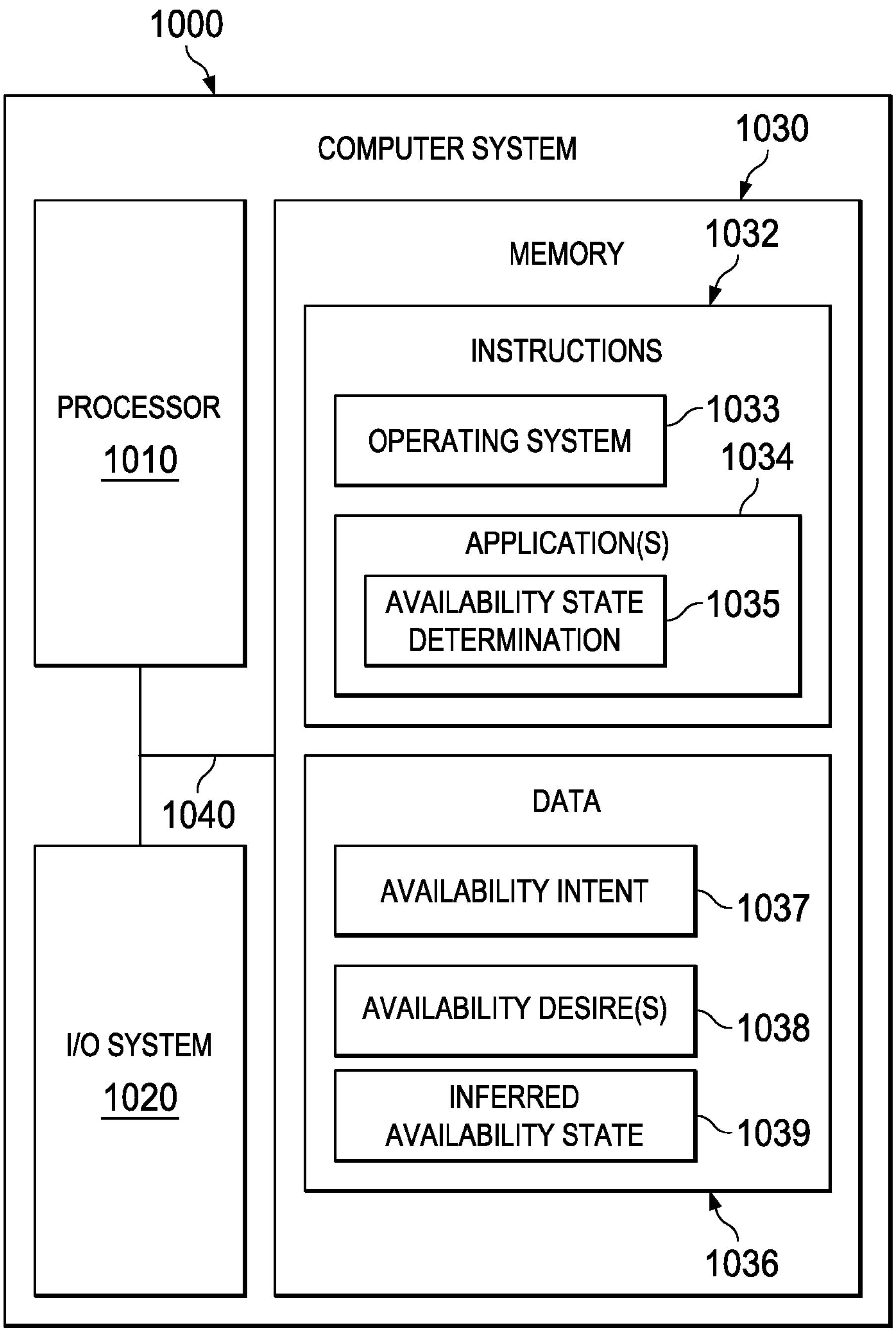
FIG. 10 is a block diagram illustrating an example computer system for determining and conveying user availability information.

FIG. 10 illustrates an example computer system 1000 that can determine and convey user availability information. System 1000 includes a processor 1010, an input/output system 1020, and memory 1030, which are coupled together by a network system 1040.

Processor 1010 may, for example, be a microprocessor, which could, for instance, operate according to reduced instruction set computer (RISC) or complex instruction set computer (CISC) principles. In general, processor 1010 may be any device that manipulates information in a logical manner.

Input/output system 1020 may, for example, include a communication interface and/or a user interface. A communication interface may, for instance, be a network interface card (whether wireless or wireless) or a modem. A user interface could, for instance, include one or more user input devices (e.g., a keyboard, a keypad, a touchpad, a stylus, and/or a microphone) and one more user output devices (e.g., a monitor, a display, and/or a speaker). In general, system 1020 may be any combination of devices by which a computer system can receive and output information.

Memory 1030 may, for example, include random access memory (RAM), read-only memory (ROM), and/or disc memory. Various items may be stored in different portions of the memory at various times. Memory 1030, in general, may be any combination of devices for storing information.

Memory 1030 includes instructions 1032 and data 1036. Instructions 1032 include an operating system 1033 (e.g., Windows, Linux, or Unix) and applications 1034, one of which is an availability state determination program 1035. Availability state determination program 1035 is responsible for determining a composite availability state for a user and can operate according to the processes described previously. Data 1036 includes the data required for and generated by applications 1034. For instance, data 1036 may hold inputs for availability state determination program 1035, such as an availability intent 1037 and one or more availability desires 1038, and determined elements, such as an inferred availability state 1039.

Network system 1040 is responsible for communicating information between processor 1010, input/output system 1020, and memory 1030. Network system 1040 may, for example, include a number of different types of busses (e.g., serial and parallel).

The terminology used herein is for the purpose of describing particular implementations only and is not intended to be limiting. As used herein, the singular form "a", "an", and "the" are intended to include the plural forms as well, unless the context clearly indicates otherwise. It will be further understood that the terms "comprises" and/or "comprising," when used in the this specification, specify the availability of stated features, integers, steps, operations, elements, and/or components, but do not preclude the availability or addition of one or more other features, integers, steps, operations, elements, components, and/or groups therefore.

The corresponding structure, materials, acts, and equivalents of all means or steps plus function elements in the claims below are intended to include any structure, material, or act for performing the function in combination with other claimed elements as specifically claimed. The description of the present implementations has been presented for purposes of illustration and description, but is not intended to be exhaustive or limited to the implementations in the form disclosed. Many modification and variations will be apparent to those of ordinary skill in the art without departing from the scope and spirit of the disclosure. The implementations were chosen and described in order to explain the principles of the disclosure and the practical application and to enable others or ordinary skill in the art to understand the disclosure for various implementations with various modifications as are suited to the particular use contemplated.

A number of implementations have been described for determining and conveying user availability, and several others have been mentioned or suggested. Moreover, those skilled in the art will readily recognize that a variety of additions, deletions, modifications, and substitutions may be made to these implementations while still achieving determining and conveying user availability. Thus, the scope of the protected subject matter should be judged based on the following claims, which may capture one or more concepts of one or more implementations.

The invention claimed is:

1. A method comprising:

determining an availability intent for a user of a user interface device;

determining at least one availability desire for the user;

determining a confidence factor associated with the availability intent;

determining a confidence factor associated with the at least one availability desire, wherein the confidence factors associated with the availability intent and the at least one availability desire set forth a precedence between the availability intent and the at least one availability desire;

determining, using at least one processor, a composite availability state for the user based on the availability intent and the at least one availability desire and resolving conflicts between the availability intent and the at least one availability desire based on the confidence factors associated with the availability intent and the at least one availability desire; and conveying the composite availability state to a remote server system.

2. The method of claim 1, further comprising:

determining an inferred availability state regarding the user; and using the inferred availability state, along with the user's availability intent and availability desire, in determining the composite availability state.

3. The method of claim 1, wherein the confidence factors decrease with time.

4. The method of claim 1, wherein a number of availability desires conflict with each other and determining the user's availability desire comprises resolving the conflicts among the desires.

5. The method of claim 1, wherein the conveyed user availability state comprises an availability percentage of the user and an associated message tag.

6. The method of claim 1, further comprising generating a user interface comprising a plurality of message tags that vary in their visual presentment based on distance from the composite availability state.

7. The method of claim 1, further comprising conveying the determined availability state differently to different users associated with the user.

8. A computer program product for determining and conveying user availability, the computer program product comprising:

a computer readable storage medium;

first program instructions to determine an availability intent for a user of a user interface device;

second program instructions to determine at least one availability desire for the user;

third program instructions to determine a confidence factor associated with the availability intent;

fourth program instructions to determine a confidence factor associated with the at least one availability desire, wherein the confidence factors associated with the availability intent and the at least one availability desire set forth a precedence between the availability intent and the at least one availability desire;

fifth program instructions to determine a composite availability state for the user based on the availability intent and the at least one availability desire, and resolving conflicts between the availability intent and the at least one availability desire based on the confidence factors associated with the availability intent and the at least one availability desire; and sixth program instructions to convey the user's availability state to a remote server system, wherein said program instructions are stored on said computer readable storage medium.

9. The computer program product of claim 8, further comprising seventh program instructions for determining an inferred availability state regarding the user, wherein the fifth program instructions are further adapted to use the inferred availability state, along with the user's availability intent and availability desire, in determining the composite availability state.

10. The computer program product of claim 8, wherein the confidence factors decrease with time.

11. The computer program product of claim 8, wherein a number of availability desires conflict with each other and the second program instructions resolve the conflicts among the desires in determining the user's availability desire.

12. The computer program product of claim 8, wherein the conveyed user availability state comprises an availability percentage of the user and an associated message tag.

13. The computer program product of claim 8, further comprising fifth program instructions to generate a user interface comprising a plurality of message tags that vary in their visual presentment based on distance from the current availability state.

14. The computer program product of claim 8, further comprising sixth program instructions to convey the determined availability state differently to different users associated with the user.

* * * * *